United States Patent
Honda et al.

(10) Patent No.: US 8,328,232 B2
(45) Date of Patent: Dec. 11, 2012

(54) AIRBAG APPARATUS

(75) Inventors: Kensaku Honda, Aichi-ken (JP); Yuji Sato, Aichi-ken (JP); Koji Shibayama, Aichi-ken (JP); Atsushi Nagata, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 395 days.

(21) Appl. No.: 12/659,130

(22) Filed: Feb. 26, 2010

(65) Prior Publication Data

US 2010/0244418 A1    Sep. 30, 2010

(30) Foreign Application Priority Data

Mar. 27, 2009    (JP) .................. 2009-079180

(51) Int. Cl.
  *B60R 21/239*    (2006.01)
(52) U.S. Cl. .............. 280/739; 280/742; 280/743.1
(58) Field of Classification Search ........... 280/739, 280/740, 742, 743.1
  See application file for complete search history.

(56) References Cited

U.S. PATENT DOCUMENTS

| | | | | |
|---|---|---|---|---|
| 3,118,468 | A * | 1/1964 | Bochan .............. | 137/846 |
| 5,492,363 | A * | 2/1996 | Hartmeyer et al. ........ | 280/739 |
| 6,402,190 | B1 | 6/2002 | Heudorfer et al. | |
| 7,543,849 | B2 * | 6/2009 | Bradburn ............. | 280/739 |
| 7,658,403 | B2 | 2/2010 | Kawabe et al. | |
| 2003/0209895 | A1 | 11/2003 | Gu | |
| 2004/0188990 | A1 * | 9/2004 | Short et al. .......... | 280/739 |
| 2008/0315565 | A1 | 12/2008 | Kawabe et al. | |

FOREIGN PATENT DOCUMENTS

| | | |
|---|---|---|
| JP | A-2001-277991 | 10/2001 |
| JP | 2007-022306 | 2/2007 |
| JP | A-2009-255827 | 11/2009 |

OTHER PUBLICATIONS

Notice of Allowance mailed Jul. 14, 2011 in corresponding Japanese Application No. 2009-079180.

* cited by examiner

*Primary Examiner* — Toan To
*Assistant Examiner* — George Spisich
(74) *Attorney, Agent, or Firm* — Posz Law Group, PLC

(57) ABSTRACT

An airbag apparatus includes an airbag. The airbag includes a gas releasing valve having first and second valve body portions each have a flexible portion. The flexible portions are flexible toward a released gas downstream side of inflation gas. An auxiliary joint portion joins the first and second valve body portions to each other and extending, from a position in the vicinity of and on a released gas upstream side of the flexible portion, further toward the released gas upstream side. A flex-resistant portion that extends in the gas releasing direction and is less flexible than the flexible portion is arranged on the auxiliary joint portion of the gas releasing valve or in the vicinity of the auxiliary joint portion.

7 Claims, 12 Drawing Sheets

Vehicle Outside ← → Vehicle Inside

AIRBAG APPARATUS

BACKGROUND OF THE INVENTION

The present invention relates to an airbag apparatus mounted in a vehicle to protect an occupant of the vehicle or pedestrians from an impact and, more particularly, to an airbag apparatus having an airbag including a vent hole and a gas releasing valve, which selectively opens and closes the vent hole.

Airbag apparatuses are widely known as apparatuses for protecting occupants of vehicles or pedestrians. An airbag apparatus has an airbag, which is formed by sewing peripheral portions of a pair of fabric sheets together, and an inflator arranged in the airbag.

In one such air bag apparatus, such as a side airbag apparatus for protecting an occupant from an impact from the side, the airbag is incorporated in a seat back of a vehicle together with the inflator.

When an impact is applied to a body side portion of the vehicle from the side, the side airbag apparatus supplies inflation gas from the inflator into the airbag. The inflation gas inflates and deploys the airbag, and the airbag comes out of the seat of the vehicle with a part of the airbag remaining in the seat back. The airbag is inflated and developed forward in the narrow space between the occupant seated on the seat and the body side portion of the vehicle. When inflated and developed, the airbag is arranged between the occupant and the body side portion, which projects into the interior of the vehicle, restrains and protects the occupant. After the airbag is inflated and developed, the excessive inflation gas in the airbag is discharged to the outside of the airbag through a vent hole formed in the airbag.

As a technique related to such vent holes, Japanese Laid-Open Patent Publication No. 2007-22306, for example, discloses an airbag apparatus having a gas releasing valve that opens a vent hole according to the pressure in the airbag. The airbag apparatus employs a sheet having an opening formed at the center as a gas releasing valve. The gas releasing valve has a first sheet portion and a second sheet portion, each of which forms a corresponding half of the sheet with respect to the opening, which is the boundary. The gas releasing valve is arranged outside the airbag in such a manner that the opening corresponds to the vent hole. The gas releasing valve is then joined to the airbag along the periphery of the vent hole. Further, the first sheet portion and the second sheet portion are joined together in such a manner as to close the opening of the sheet. When the pressure in the airbag becomes greater than or equal to a predetermined value, the first sheet portion and the second sheet portion of the gas releasing valve are separated from each other, thus exposing the vent hole.

The airbag apparatus maintains the vent hole closed by the gas releasing valve until the airbag is inflated and the pressure in the airbag reaches the predetermined value. This prevents the inflation gas from escaping to the outside of the airbag through the vent hole. This quickly raises the pressure in the airbag, thus promoting, or in other words, increasing the speed of inflation of the airbag. When the pressure in the airbag becomes greater than or equal to the predetermined value, the first sheet portion and the second sheet portion of the gas releasing valve are disconnected from each other at the joint portion, in such a manner as to expose the vent hole. This discharges the inflation gas from the vent hole to the outside of the airbag, thus decreasing the pressure in the airbag. As a result, the occupant is protected from an impact by the airbag having an appropriate level of hardness.

In the airbag apparatus described in the aforementioned document, the vent hole is opened by operating the gas releasing valve according to the pressure in the airbag. However, the vent hole is opened by rupturing the joint portion between the first sheet portion and the second sheet portion of the gas releasing valve. Such a method, which physically breaks the joint portion, makes it difficult to open the vent hole in response to a certain level of pressure in the airbag. In other words, it is difficult to suppress variation of the rupture strength of the first sheet portion and the second sheet portion of the gas releasing valve. This varies the timings at which the vent hole is opened. Accordingly, the airbag apparatus must be improved in order to suppress such variation of the valve opening timings and enhance the stability for opening the gas releasing valve.

SUMMARY OF THE INVENTION

Accordingly, it is an objective of the present invention to provide a simply configured gas releasing valve that suppresses variation of opening timings of a vent hole without depending on a method involving rupture of a joint portion.

To achieve the foregoing objective and in accordance with one aspect of the present invention, an airbag apparatus having an airbag having an inflating portion is provided. The inflating portion of the airbag has a pair of gas releasing walls. A vent hole is formed between the gas releasing walls to discharge inflation gas from the inflating portion. The airbag includes a gas releasing valve having a first valve body portion and a second valve body portion that are arranged in the vicinity of the vent hole and overlapped with each other. The gas releasing valve operates according to a pressure in the airbag to selectively open and close the vent hole. The first valve body portion and the second valve body portion each have an end at a released gas downstream side on which the inflation gas is discharged. The end of each of the first valve body portion and the second valve body portion on the released gas downstream side is joined to corresponding one of the gas releasing walls with a downstream end joint portion extending in a direction crossing a releasing direction of the inflation gas. The first and second valve body portions each have a flexible portion arranged in a part in the vicinity of and on a released gas upstream side of the corresponding downstream end joint portion. The flexible portions are flexible toward the released gas downstream side of the inflation gas. Each of the first and second valve body portions has a first side portion and a second side portion on both sides of an extending direction of the downstream end joint portion. The first side portion of each valve body portion is joined to at least the corresponding gas releasing wall with a first edge joint portion. A wall joint portion, which joins at least both gas releasing walls to each other, is arranged on the first edge joint portion or in the vicinity of the first edge joint portion. The second side portions of the first valve body portion and the second valve body portion are joined to each other with a second edge joint portion extending in the gas releasing direction. An auxiliary joint portion is arranged between the first edge joint portion and the second edge joint portion and in the vicinity of the second edge joint portion. The auxiliary joint portion joins the first valve body portion and the second valve body portion to each other and extends, from a position in the vicinity of and on the released gas upstream side of the flexible portion, further toward the released gas upstream side. A flex-resistant portion that extends in the gas releasing direction and is less flexible than the flexible portion is arranged on the auxiliary joint portion of the gas releasing valve or in the vicinity of the auxiliary joint portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A side airbag apparatus according to one embodiment of the present invention will now be described with reference to FIGS. 1 to 17. In the description below, the direction in which the vehicle advances (moves forward) is defined as the forward direction.

Figure 1:
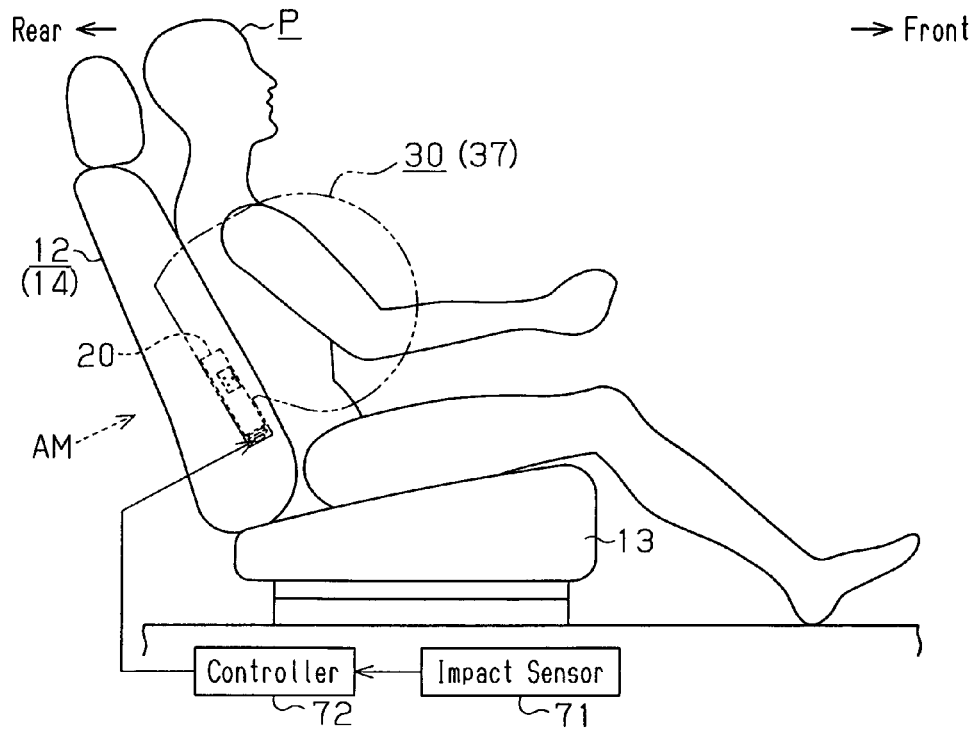
FIG. 1 is a side view showing, together with an occupant, a vehicle seat in which a side airbag apparatus according to one embodiment of the present invention is mounted.
Figure 2:
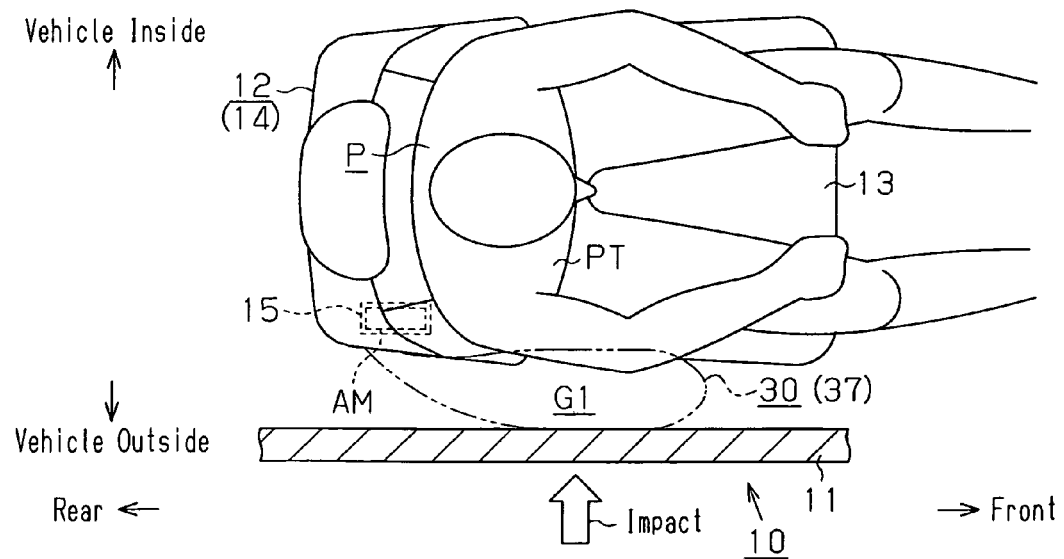
FIG. 2 is a plan cross-sectional view showing the vehicle seat illustrated in FIG. 1, the occupant, and a body side portion.
Figure 3:
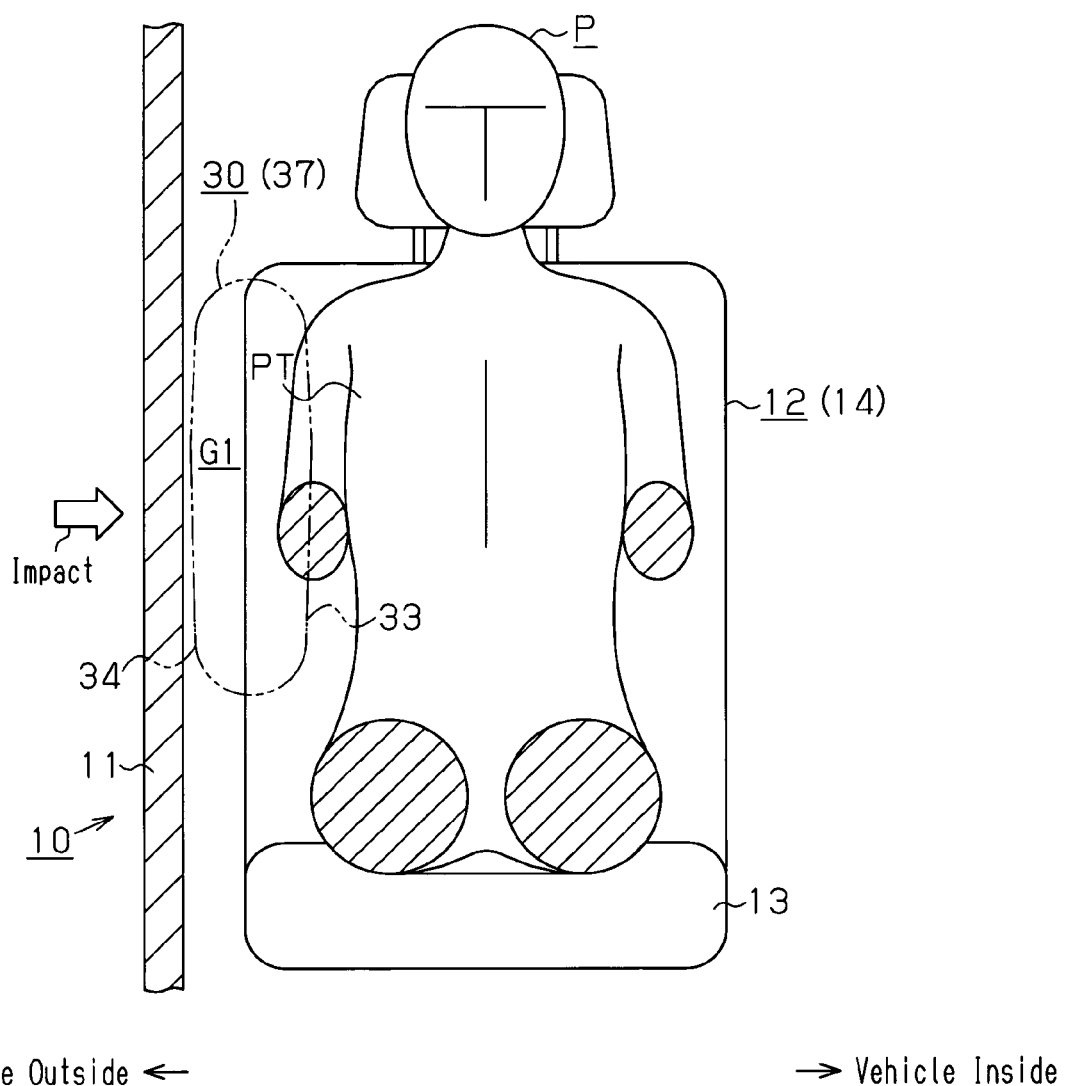
FIG. 3 is a front cross-sectional view showing the vehicle seat illustrated in FIG. 1, the occupant, and the body side portion.

As illustrated in FIGS. 1 to 3, a vehicle seat 12 is arranged on the inner side of and in the vicinity of a body side portion 11 of a vehicle 10. The body side portion 11 refers to components arranged on both sides of the widthwise direction of the vehicle 10. For example, the body side portion 11 corresponding to a front seat includes a front door and a center pillar (a B pillar). The body side portion 11 corresponding to a rear seat includes a rear portion of a side door (a rear door), a rear pillar (a C pillar), a front portion of a wheel well, and a rear quarter panel.

The vehicle seat 12 includes a seat cushion 13 and a seat back 14, which extends upright from the rear side of the seat cushion 13 and has a tilt adjustment mechanism (not shown). A storage portion 15 is arranged in a side portion of the seat back 14 located on the vehicle outer side. An airbag module AM, which is a major part of the side airbag apparatus, is stored in the storage portion 15. The storage portion 15 is located diagonally rearward from and in the vicinity of an occupant P who is seated on the vehicle seat 12. The airbag module AM mainly includes an inflator assembly 20 (see FIG. 5) serving as a gas supply source and an airbag 30, which is inflated by inflation gas supplied from the inflator assembly 20.

The respective components of the airbag module AM will hereafter be explained. In the present embodiment, the up-down direction and the front-rear direction of the airbag module AM and its components are defined with reference to the seat back 14 of the vehicle seat 12. That is, the direction in which the seat back 14 is upright is referred to as the up-down direction, and the direction of the thickness of the seat back 14 is referred to as the front-rear direction. Normally, the seat back 14 is used in a state tilted slightly rearward. Accordingly, the up-down direction is not strictly the vertical direction, but corresponds to a slightly tilted direction. Similarly, the front-rear direction is not strictly the horizontal direction, but corresponds to a slightly tilted direction.

<Inflator Assembly 20>

Figure 4:
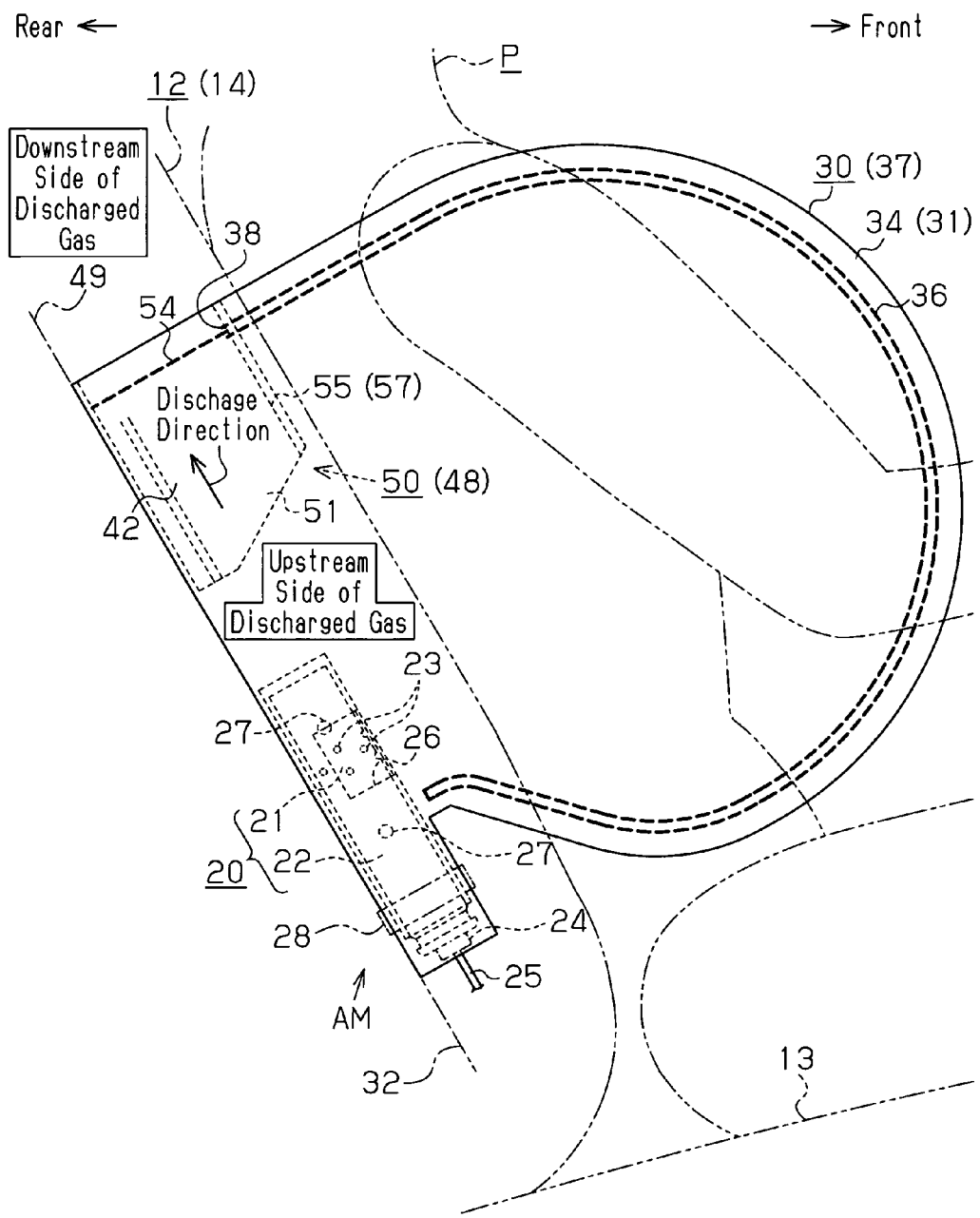
FIG. 4 is a side view showing, together with the occupant, an airbag module with an airbag in a flatly developed state.
Figure 5:
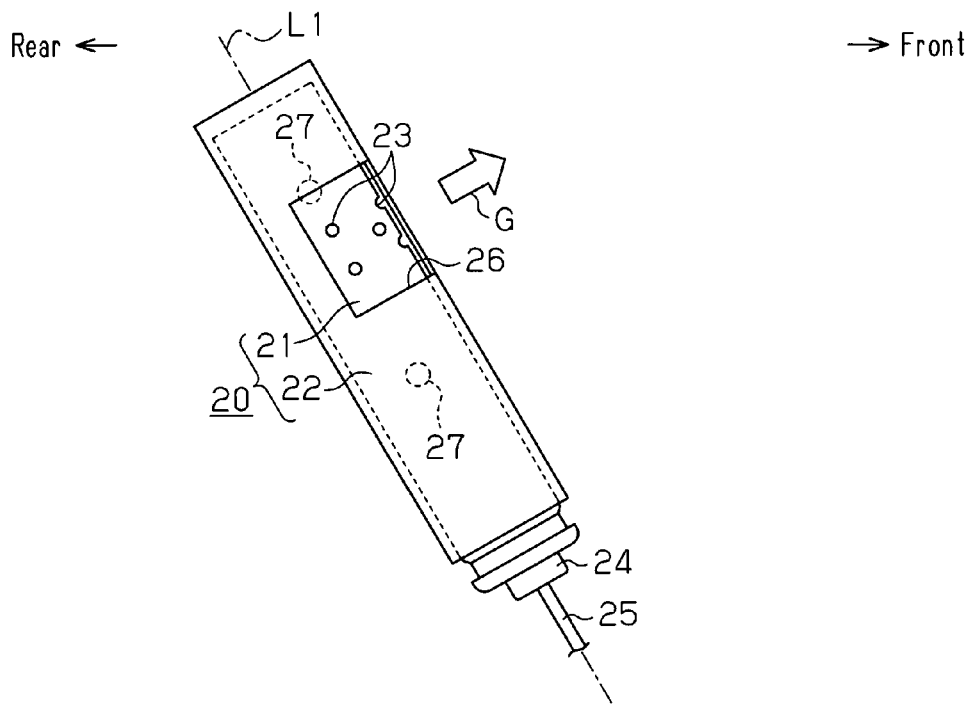
FIG. 5 is a side view showing an inflator assembly arranged in the airbag illustrated in FIG. 4.
Figure 6:
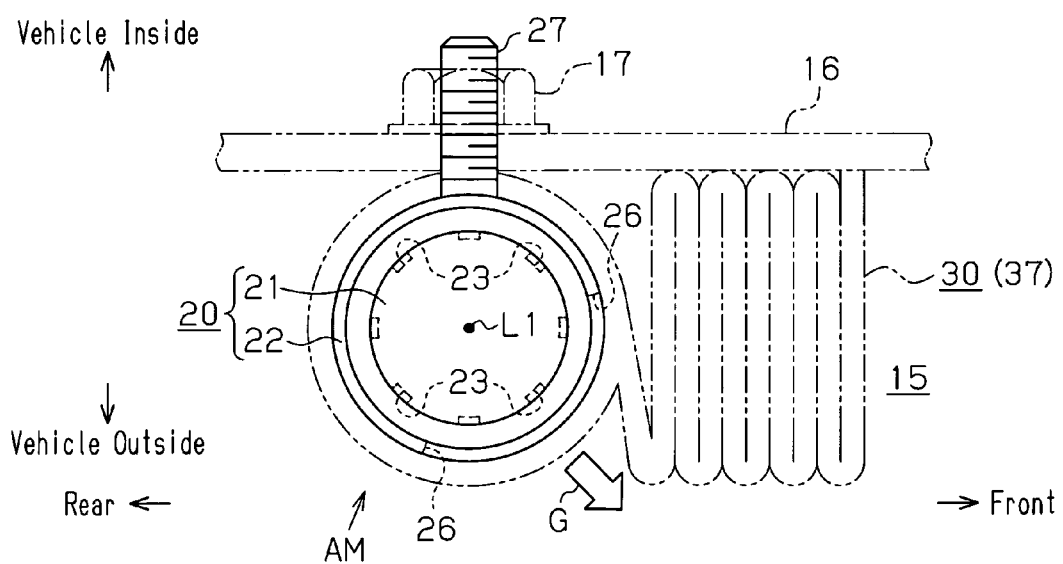
FIG. 6 is a plan view showing the inflator assembly illustrated in FIG. 5 as viewed from diagonally above and behind, together with a seat frame, a nut, and the airbag.

FIG. 4 schematically illustrates the airbag module AM with the airbag 30 that is flat without inflation gas G (hereinafter, referred to as a flatly developed state), together with the occupant P. FIG. 5 illustrates the inflator assembly 20, which is arranged in the airbag 30 illustrated in FIG. 4. FIG. 6 illustrates the inflator assembly 20 illustrated in FIG. 5 as viewed from diagonally above and behind.

With reference to FIGS. 4 to 6, the inflator assembly 20 has an inflator 21 and a retainer 22, which covers the inflator 21 from outside. The inflator 21 substantially has a columnar shape that is elongated substantially along the up-down direction. A gas generating agent (not shown), which generates the inflation gas G in response to an activation signal from the outside, is received in the inflator 21. A plurality of gas holes 23, through which the generated inflation gas G is blasted radially outward, are formed in an upper portion of the inflator 21. A connector portion 24 is arranged in a lower end portion of the inflator 21. A harness 25 serving as a cable for sending a control signal to the inflator 21 is connected to the connector portion 24.

As the inflator 21, a type that blasts the inflation gas G by rupturing a partition wall of a high-pressure gas cylinder retaining high-pressure gas using low explosive may be employed instead of the aforementioned type, which employs the gas generating agent.

The retainer 22 functions as a diffuser and fixes the inflator 21, together with the airbag 30, to a seat frame 16 (see FIG. 6) arranged in the seat back 14. A most part of the retainer 22 is shaped substantially as a cylinder that is elongated substantially in the up-down direction by bending a plate such as a metal plate. A window 26, through which some of the gas holes 23 of the inflator 21 are exposed from the retainer 22, is formed in an upper front part of the retainer 22. The inflation gas G is blasted from the gas holes 23 generally toward the front side of the vehicle 10 through the window 26.

The retainer 22 is fixed to the seat frame 16 by means of a plurality of (in the present embodiment, two) bolts 27 serving as locking members. In other words, the inflator 21 is fixed indirectly by the bolts 27 with the retainer 22. Each of the bolts 27 extends in a direction perpendicular to the axis L1 of the inflator 21.

The inflator assembly 20 may formed by an inflator 21 and a retainer 22 that are formed as an integral body.

<Airbag 30>

As shown in FIGS. 1 to 3, when the vehicle 10 is hit from the side while moving, and an impact is applied to the body side portion 11 from the side (from below as viewed in FIG. 2, and from the left as viewed in FIG. 3), the airbag 30 is inflated and developed by the inflation gas G (see FIGS. 5 and 6) sent from the inflator 21. The airbag 30 then comes out from the storage portion 15 substantially toward the front side of the vehicle 10 with a part remaining in the storage portion 15. The airbag 30 is thus inflated and developed in a gap G1 between the vehicle seat 12 and the body side portion 11. This allows the airbag 30 to restrain the occupant P, thus protecting the occupant P from the aforementioned impact.

Figure 7:
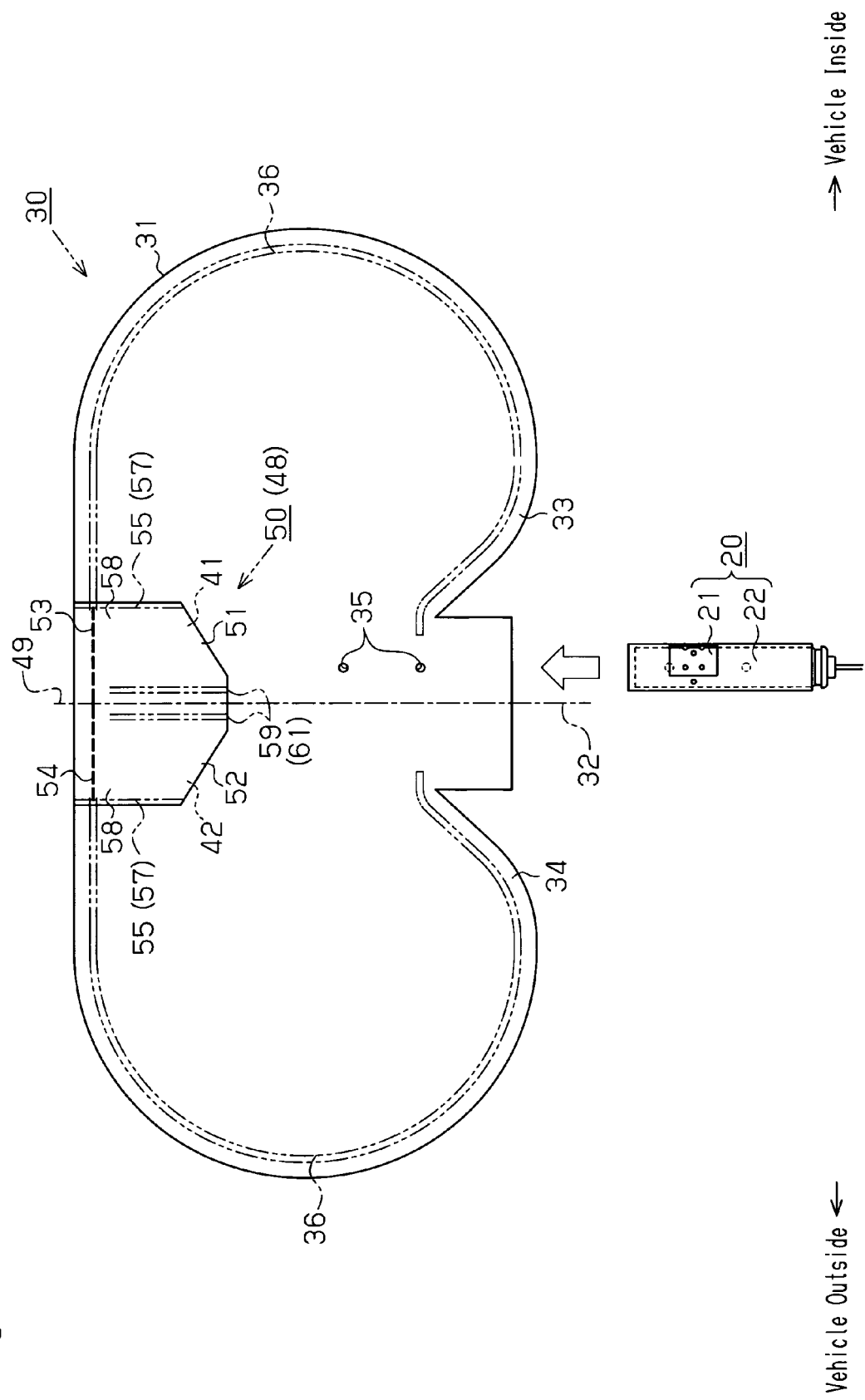
FIG. 7 is a developed view showing, together with the inflator assembly, the airbag held in a flatly developed state and a gas releasing valve in the process of manufacture of the airbag module.

FIG. 7 illustrates the airbag 30 in the process of manufacture. As shown in FIGS. 4 and 7, the airbag 30 is formed by a fabric panel 31, which is a single fabric sheet. Specifically, the airbag 30 is formed by folding the fabric panel 31 in half along a fold line 32, which is set along the midline of the fabric panel 31, and joining the overlapped portions together in a bag-like shape. To distinguish the two overlapped portions of the airbag 30, a part that is located on the vehicle inner side is referred to as a fabric portion 33, and a part located on the vehicle outer side is referred to as a fabric portion 34.

In the fabric panel 31, the outlines of the two fabric portions 33, 34 are axisymmetrical with each other with respect to the fold line 32. The fabric portions 33, 34 are each shaped and sized in such a manner that, when the airbag 30 is inflated and developed between the vehicle seat 12 and the body side portion 11, the airbag 30 occupies the zone corresponding to the thorax PT of the occupant P outside and in the vicinity of the occupant P, who is seated on the vehicle seat 12.

In the fabric portion 33, which is located on the vehicle inner side, bolt holes 35 are formed at two positions in the vicinity of the fold line 32, which are spaced apart in the up-down direction.

The fabric portions 33, 34 are joined together along a peripheral joint portion 36, which is arranged along the peripheries of the fabric portions 33, 34. In the present embodiment, the peripheral joint portion 36 is formed by sewing a part of the periphery of the fabric portion 33 except for the rear end and the upper and lower ends with a corresponding part of the periphery of the fabric portion 34 (using sewing threads).

In FIGS. 4, 7, 8, 11, 12, 13, 14, 15, 16, 18, and 20, the sewn portions are represented by two types of lines, which are bold broken lines and dotted lines. The bold broken lines represent the sewing threads on the outer sides (not between the inner sides) of the fabric sheets to be sewn (see FIGS. 4 and 7, for example). The dotted lines represent the sewing threads inside the fabric sheets (between the inner sides of the fabric sheets) to be sewn (see FIGS. 8 and 11, for example). In other words, the drawings representing the sewing threads by the dotted lines illustrate a cross section along the sewn portions.

The space between the two fabric portions 33, 34 and surrounded by the peripheral joint portion 36 forms an inflating portion 37. The inflating portion 37 is inflated by the inflation gas G outside and in the vicinity of the thorax PT of the occupant P, thus protecting the thorax PT of the occupant P from an impact. In the present embodiment, the interior of the airbag 30 is not divided and the airbag 30 includes only the inflating portion 37.

Alternatively, the airbag 30 may be formed by overlapping a pair of independent fabric panels with each other. In this case, the fabric panel located on the vehicle inner side is the fabric portion 33, and the other fabric panel, which is located on the vehicle outer side is the fabric portion 34. The fabric portions 33, 34 are joined together in a bag-like shape.

Further, the peripheral joint portion 36 may be formed by means other than the aforementioned means using the sewing threads, which is, for example, adhesion using an adhesive. A first downstream end joint portion 53, a second downstream end joint portion 54, a first edge joint portion 55, a wall joint portion 57, a flex-resistant portion 59, and an auxiliary joint portion 61, which will be explained later, will be formed by any suitable means in similar manners.

<Attachment of Inflator Assembly 20 to Airbag 30>

As illustrated in FIG. 4, the inflator assembly 20 is arranged in a lower portion of the airbag 30 and at the front side and in the vicinity of the fold line 32, while being inclined downward toward the front. The two bolts 27 of the retainer 22 are passed through the corresponding bolt holes 35 (see FIG. 7) of the fabric portion 33, which is located on the vehicle inner side. This maintains the inflator assembly 20 in a state positioned with respect to the airbag 30. A lower rear end of the airbag 30 is airtightly fastened to a lower part of the inflator assembly 20 by means of an annular fastener 28.

A gas releasing hole, which is a vent hole 38, is formed in the airbag 30 to discharge the inflation gas G so as to adjust the pressure in the inflating portion 37. In the present embodiment, the vent hole 38 is located in an upper end portion of the airbag 30 and at the front side and in the vicinity of the fold line 32. The inflation gas G is thus discharged substantially upward from the inflating portion 37 of the airbag 30 through the vent hole 38. The direction in which the inflation gas G flows in this state is defined as a gas releasing direction. A side closer to the center of the inflating portion 37 with respect to the vent hole 38 is defined as a released gas upstream side. A side spaced from the center of the inflating portion 37 with respect to the vent hole 38 (a side corresponding to the outside of the airbag 30) is defined as a released gas downstream side.

Figure 8:
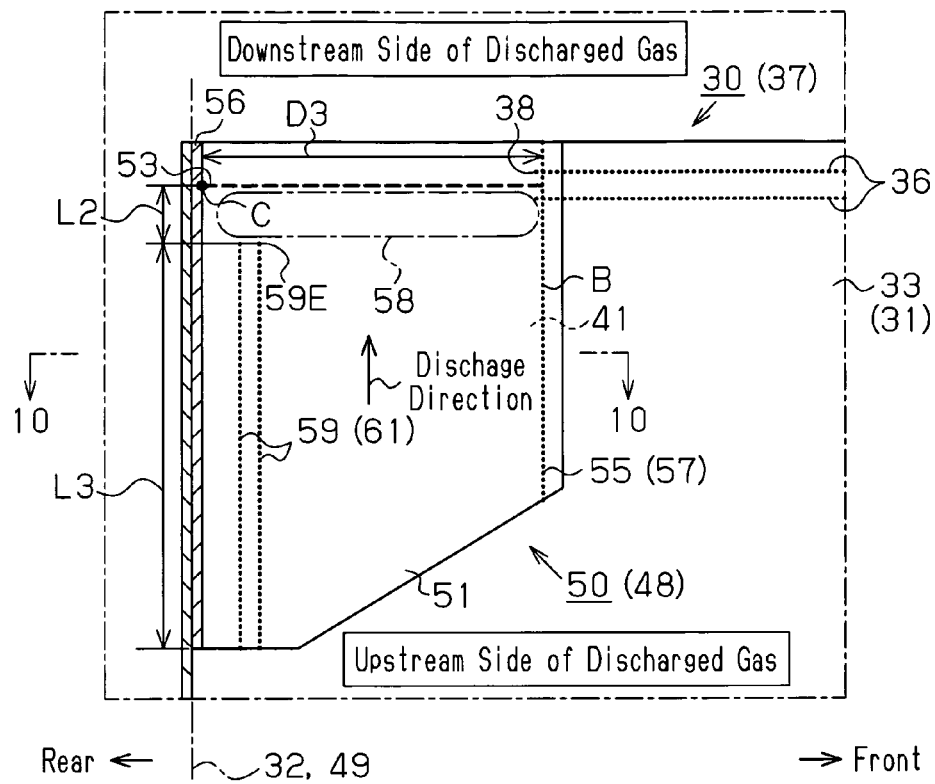
FIG. 8 is an enlarged cross-sectional view showing a part of the interior of the airbag module when the seat back is upright substantially in a vertical direction, illustrating the gas releasing valve and the proximity of the gas releasing valve.
Figure 9:
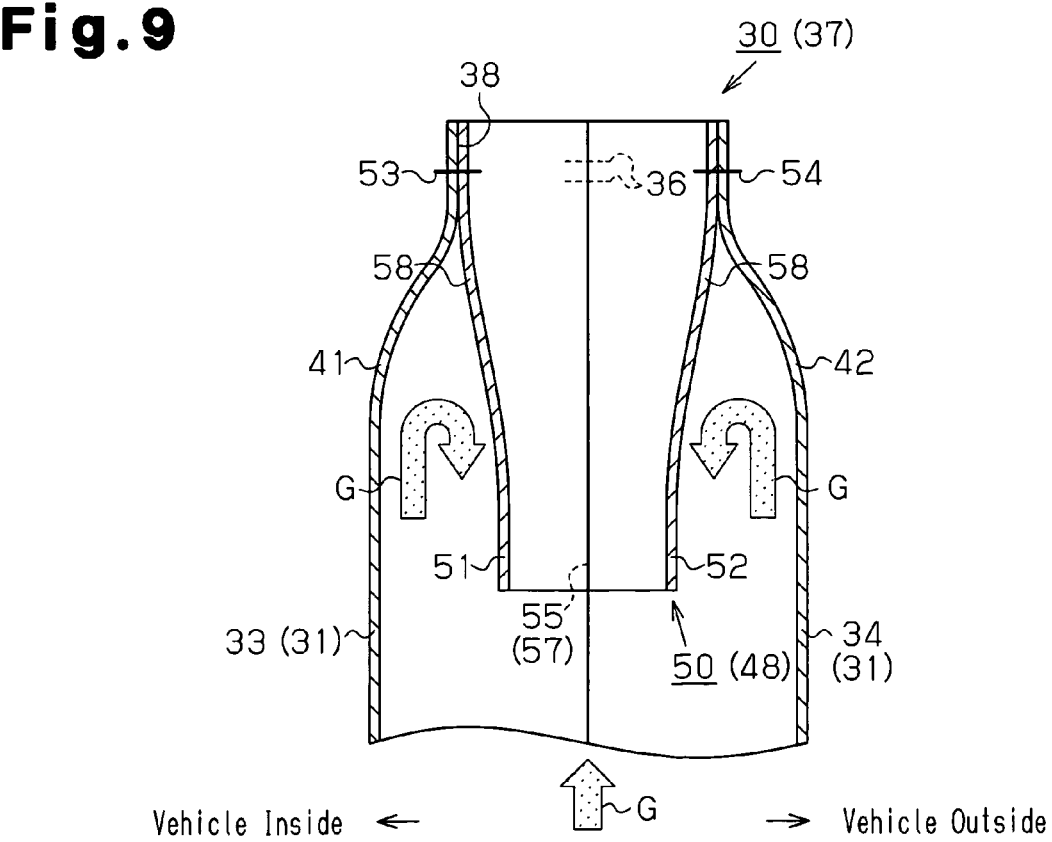
FIG. 9 is a cross-sectional view showing a part of the gas releasing valve at an early stage of inflation of the airbag.
Figure 10:
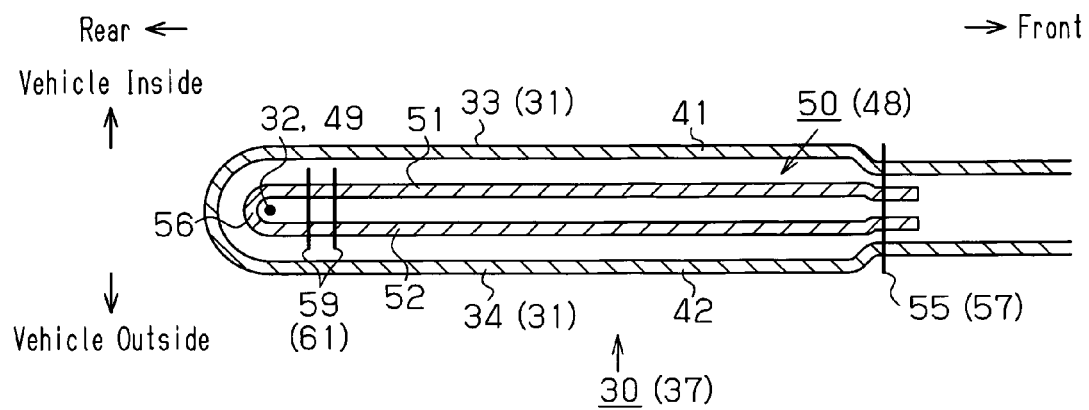
FIG. 10 is a cross-sectional view taken along line 10-10 of FIG. 8.

As illustrated in FIGS. 8 to 10, the vent hole 38 is formed by a part of an upper part of each one of the fabric portions 33, 34, which are overlapped with each other, and located at a position at which the peripheral joint portion 36 is not arranged. In the fabric portion 33 on the vehicle inner side, the portion forming the vent hole 38 and the vicinity of the vent hole 38 is defined as a first gas releasing wall 41, for the sake of distinction from other portions. Also, in the fabric portion 34 located on the vehicle outer side, the portion forming the vent hole 38 and the vicinity of the vent hole 38 is defined as a second gas releasing wall 42, for the sake of distinction from other portions. The gas releasing walls 41, 42 are held in flat shapes when the airbag 30 is not inflated.

Further, in the present embodiment, a gas releasing valve 50 is provided to selectively open and close the vent hole 38 according to the pressure in the inflating portion 37. The gas releasing valve 50 will hereafter be explained.

<Gas Releasing Valve 50>

With reference to FIGS. 7 to 10, the gas releasing valve 50 is formed by a single fabric sheet 48. The fabric sheet 48 is arranged on the fabric portions 33, 34 of the fabric panel 31 including the fold line 32 of the fabric panel 31. With a fold line 49, which is set along the midline of the fabric sheet 48, coinciding with the fold line 32 of the fabric panel 31, the fabric sheet 48 is folded in half, together with the fabric panel 31, along the fold lines 32, 49. In this manner, the fabric sheet 48 is folded flatly. To distinguish the two overlapped portions of the fabric sheet 48 from each other, a part that is located on the vehicle inner side is defined as a first valve body portion 51, and a part that is located on the vehicle outer side is defined as a second valve body portion 52.

The end of the first valve body portion 51 on the released gas downstream side is joined to the first gas releasing wall 41 of the airbag 30, which is located on the vehicle inner side, through the first downstream end joint portion 53. The first downstream end joint portion 53 extends substantially along the front-rear direction, which crosses the releasing direction of the inflation gas G. The end of the second valve body portion 52, which is located on the vehicle outer side, on the released gas downstream side is joined to the second gas releasing wall 42 of the airbag 30, which is located on the vehicle outer side, through the second downstream end joint portion 54. The second downstream end joint portion 54 extends substantially along the front-rear direction, which crosses the gas releasing direction of the inflation gas G. In the gas releasing valve 50, the first valve body portion 51 located on the vehicle inner side and the second valve body portion 52 located on the vehicle outer side are not joined together at the ends located on the released gas downstream side.

As illustrated in FIGS. 8 to 10, a front part of each one of the first valve body portion 51 and the second valve body portion 52, which serves as a first side portion of the valve body portion 51, 52 in the direction in which the associated downstream end joint portion 53, 54 extends, is joined to at least the corresponding gas releasing wall 41, 42 with the first edge joint portion 55. In the present embodiment, the front part of each valve body portion 51, 52 is joined to the corresponding gas releasing wall 41, 42 with the first edge joint portion 55. The first edge joint portion 55 is formed by sewing the front parts of the valve body portions 51, 52 and the gas releasing walls 41, 42 together (integrally). The first edge joint portion 55 extends from the ends of the valve body portions 51, 52 on the released gas downstream side toward the released gas upstream side, thus reaching the ends of the valve body portions 51, 52 on the released gas upstream side. The end of the first edge joint portion 55 on the released gas downstream side crosses the peripheral joint portion 36. The first edge joint portion 55 functions also as the wall joint portion 57. The wall joint portion 57 is arranged on the first edge joint portion 55 or in the vicinity of the first edge joint portion 55 and joins at least the two gas releasing walls 41, 42 together.

A flexible portion 58 is arranged in a part of the first valve body portion 51 in the vicinity of and on the released gas upstream side of the first downstream end joint portion 53. Specifically, the zone between the first downstream end joint portion 53 and the position spaced from the first downstream end joint portion 53 by the length L2 toward the released gas upstream side (encompassed by the single-dotted chain lines in FIG. 8) is the flexible portion 58, which is soft and easily flexed toward the released gas downstream side when receiving the pressure of the inflation gas G. Similarly, the corresponding part of the second valve body portion 52 in the vicinity of and on the released gas upstream side of the second downstream end joint portion 54 is the flexible portion 58, which is soft and easily flexed toward the released gas downstream side when receiving the pressure of the inflation gas G.

The rear parts of the first valve body portion 51 and the second valve body portion 52, which serve as second side portions in the extending direction of the downstream end joint portions 53, 54, are joined together with the second edge joint portion 56 extending toward the released gas upstream side. In the present embodiment, the first valve body portion 51 located on the vehicle inner side and the second valve body portion 52 located on the vehicle outer side are formed by folding the single fabric sheet 48 in half along the fold line 49. Accordingly, the folded portion of the fabric sheet 48 (in the proximity of the fold line 49) corresponds to the second edge joint portion 56.

A flex-resistant portion 59 is arranged in a rear part of each valve body portion 51, 52 in the extending direction of the downstream end joint portion 53, 54, and more accurately, the zone spaced slightly forward from the fold line 49 of the fabric sheet 48. In the rear part of each valve body portion 51, 52, the flex-resistant portion 59 extends from the position on the released gas upstream side and in the vicinity of the associated flexible portion 58 further toward the released gas upstream side. Specifically, the position on the released gas upstream side and in the vicinity of each flexible portion 58 is the position spaced from the associated downstream end joint portion 53, 54 by a certain distance (the length L2), with the flexible portion 58 arranged between this position and the downstream end joint portion 53, 54. The flex-resistant portions 59 are formed by sewing the valve body portions 51, 52 together along one or more rows (in the present embodiment, two rows) using sewing threads. The flex-resistant portions 59 are harder (has more rigidity) and less flexible than the flexible portions 58 and other joint portions of the gas releasing valve 50 (which are the downstream end joint portions 53, 54, the first edge joint portion 55, the second edge joint portion 56, and the wall joint portion 57).

Each of the flex-resistant portions 59 functions also as an auxiliary joint portion 61. Each auxiliary joint portion 61 joins the first valve body portion 51 to the second valve body portion 52 at a position between the first edge joint portion 55 and the second edge joint portion 56 of the valve body portions 51, 52 and in front of and in the vicinity of the second edge joint portion 56. The auxiliary joint portion 61 extends toward the released gas upstream side from the position spaced from the downstream end joint portion 53, 54 toward the released gas upstream side, with the flexible portion 58 located between the downstream end joint portion 53, 54 and the auxiliary joint portion 61.

Since the first edge joint portion 55 (the wall joint portion 57) and each flex-resistant portion 59 (each auxiliary joint portion 61) extend linearly toward the released gas upstream side, the first edge joint portion 55 (the wall joint portion 57) and the flex-resistant portion 59 (the auxiliary joint portion 61) extend parallel with each other. Accordingly, the interval (the flow passage area of the inflation gas G) between the first edge joint portion 55 (the wall joint portion 57) and each flex-resistant portion 59 (each auxiliary joint portion 61) is uniform along the longitudinal directions of the first edge joint portion 55 and the flex-resistant portion 59 (along the gas releasing direction).

Each flex-resistant portion 59 restricts separation between the ends of the gas releasing walls 41, 42 on the released gas downstream side and separation between the ends of the valve body portions 51, 52 on the released gas downstream side (with respect to the corresponding ends). The extent of such restriction becomes higher as a downstream end 59E of the flex-resistant portion 59 becomes closer to the downstream end joint portions 53, 54 (as the length L2 becomes smaller) or as the flex-resistant portion 59 becomes closer to the wall joint portion 57. Accordingly, the downstream end 59E of the flex-resistant portion 59 is arranged at such a position (height) that the downstream end 59E is prevented from greatly hampering the separation of the downstream ends of the gas releasing walls 41, 42 and the valve body portions 51, 52.

Figure 11:
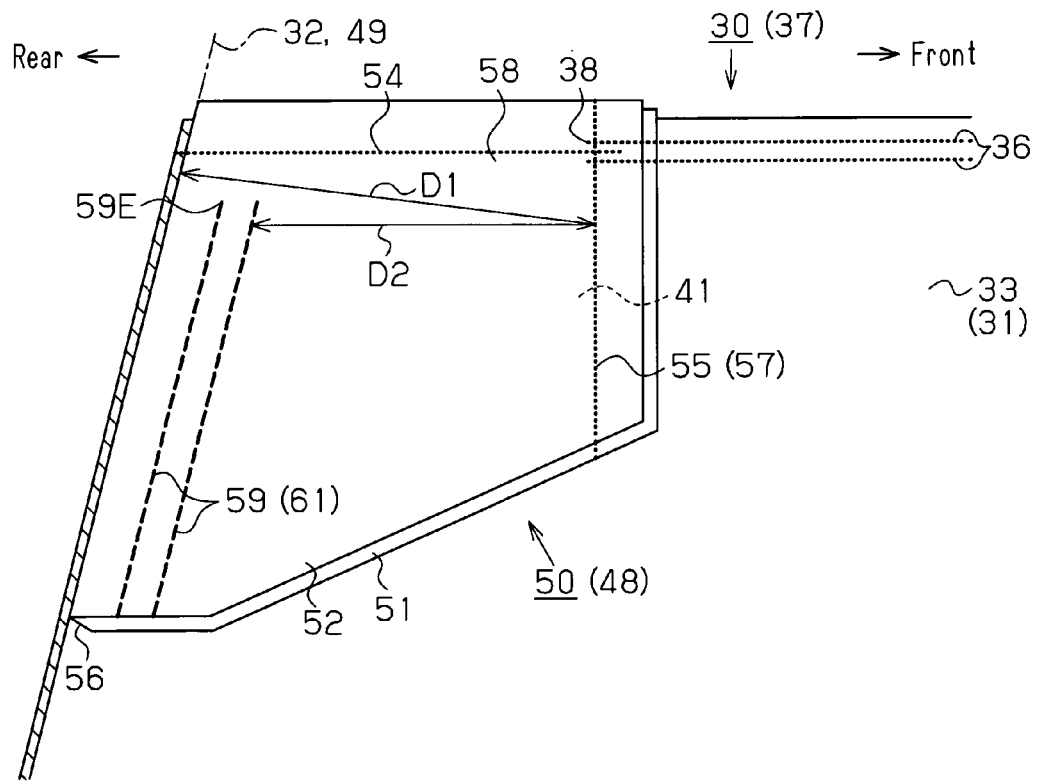
FIG. 11 is a diagram schematically illustrating the gas releasing valve before the airbag is inflated.

As illustrated in FIG. 11, in the gas releasing valve 50 having the above-described configuration, the flex-resistant portion 59 (the auxiliary joint portion 61) is located at a position spaced forward from the fold line 49 (the second edge joint portion 56) of the fabric sheet 48. Accordingly, in the flexible portion 58, the interval D1 between the fold line 49 (the second edge joint portion 56) and the wall joint portion 57 (the first edge joint portion 55) is set to a value greater than the interval D2 between the flex-resistant portion 59 (the auxiliary joint portion 61) and the wall joint portion 57 (the first edge joint portion 55). This indicates that, when the inflation gas G flows between the valve body portions 51, 52 and thus inflates the gas releasing valve 50, the zone between the flex-resistant portion 59 (the auxiliary joint portion 61) and the wall joint portion 57 (the first edge joint portion 55) is inflated in a cylindrical shape having a diameter smaller than the diameter of the flexible portion 58, which is the zone between the second edge joint portion 56 and the wall joint portion 57 (the first edge joint portion 55).

With reference to FIG. 8, each flex-resistant portion 59 has a length L3. The interval between a position B of the wall joint portion 57 (the first edge joint portion 55), at which the interval between the wall joint portion 57 and the flex-resistant portion 59 is minimum, and a rear end C of each downstream end joint portion 53, 54 is defined as the interval D3. In the present embodiment, the length L3 and the interval D3 are set in such a manner that the expression L3>D3 is satisfied. As has been described, the flex-resistant portion 59 (the auxiliary joint portion 61) and the first edge joint portion 55 (the wall joint portion 57) extend parallel with each other. Accordingly, the part of the first edge joint portion 55 (the wall joint portion 57) at the front side of the flex-resistant portion 59 (the auxiliary joint portion 61) corresponds to the position B, at which the interval between the first edge joint portion 55 (the wall joint portion 57) and the flex-resistant portion 59 (the auxiliary joint portion 61) is minimum uniformly along the gas releasing direction.

The end of the first valve body portion 51 on the released gas upstream side and the end of the second valve body portion 52 on the released gas upstream side are not joined together at a position of each valve body portion 51, 52 on the released gas upstream side. As has been described, the end of the first valve body portion 51 on the released gas downstream side is joined to the first gas releasing wall 41 (the fabric portion 33 located on the vehicle inner side) and the end of the second valve body portion 52 on the released gas downstream side is joined to the second gas releasing wall 42 (the fabric portion 34 located on the vehicle outer side). However, the ends of the first valve body portion 51 and the second valve body portion 52 on the released gas downstream side are not joined together. This allows the gas releasing valve 50 to inflate in a tubular shape having two ends that are open on the released gas upstream side and the released gas downstream side.

As illustrated in FIG. 9, the first valve body portion 51 of the gas releasing valve 50, which is located on the vehicle inner side, is joined to the fabric portion 33 located on the vehicle inner side with the first downstream end joint portion 53. This prohibits the inflation gas G from flowing between the first valve body portion 51 and the fabric portion 33, from the inside of the inflating portion 37 toward the outside or from the outside of the inflating portion 37 toward the inside. Similarly, the second valve body portion 52 of the gas releasing valve 50, which is located on the vehicle outer side, is joined to the fabric portion 34 located on the vehicle outer side with the second downstream end joint portion 54. This prohibits the inflation gas G from flowing between the second valve body portion 52 and the fabric portion 34, from the inside of the inflating portion 37 toward the outside or from the outside of the inflating portion 37 toward the inside. The inflation gas G is permitted to flow from the inside of the inflating portion 37 toward the outside only through the flow path between the valve body portions 51, 52 of the gas releasing valve 50.

As illustrated in FIG. 6, the airbag module AM is shaped in a small-sized and compact form (hereinafter, referred to as a storage form) both in the front-rear direction and the up-down direction by folding the airbag 30 that is held in the flatly developed state (see FIG. 4). In this manner, the airbag module AM becomes suitable for being stored in the storage portion 15 of the seat back 14, which has a limited (narrow) space.

When held in the storage form, the airbag module AM is fixed to the seat frame 16 with the two bolts 27. Specifically, the two bolts 27 passed through the corresponding bolt holes 35 of the airbag 30 are inserted through the seat frame 16, with nuts 17 fastened to the bolts 27.

The retainer 22 may be fixed to the vehicle 10 (such as the seat frame 16) by means of any suitable components other than the bolts 27.

The side airbag apparatus has an impact sensor 71 and a controller 72, apart from the above-described airbag module AM, as illustrated in FIG. 1. The impact sensor 71 is formed by an acceleration sensor and attached to the body side portion 11 of the vehicle 10 in order to detect an impact applied to the body side portion 11 from the side. The controller 72 controls operation of the inflator 21 based on a detection signal of the impact sensor 71.

The side airbag apparatus of the present embodiment is configured in the above-described manner. Next, a main operating mode of the side airbag apparatus will be explained with reference to FIGS. 12 to 16. FIGS. 12 to 16 schematically represent change of the form of the gas releasing valve 50 as the time elapses depending on whether supply of the inflation gas G is allowed or stopped. In the drawings, illustration of details is omitted or simplified.

In the side airbag apparatus, the airbag 30 is maintained in the storage form and stored continuously in the storage portion 15, together with the inflator assembly 20, unless the vehicle 10 receives an impact from the side. In this state, the valve body portions 51, 52 of the gas releasing valve 50 are held continuously in a state overlapped with each other (see FIG. 11).

When the vehicle 10 is moving and an impact greater than a predetermined level is applied to the body side portion 11, the impact is detected by the impact sensor 71. The controller 72 then outputs an activation signal for activating the inflator 21 to the inflator 21 in response to the detection signal of the impact sensor 71. With reference to FIGS. 5 and 6, in response to the activation signal, the gas generating agent of the inflator 21 generates high temperature and pressure inflation gas G. The inflation gas G is thus blasted through the gas holes 23 in directions perpendicular to the axis L1 of the inflator 21 (radial directions). In this state, rear ones of the gas holes 23 are closed by the retainer 22 and front ones of the gas holes 23 are exposed from the window 26. This blasts the inflation gas G from the front ones of the gas holes 23 substantially toward the front side of the vehicle 10 through the window 26. The front side of the vehicle 10 herein includes not only the front side but also an upper front side and a lower front side.

Figure 12:
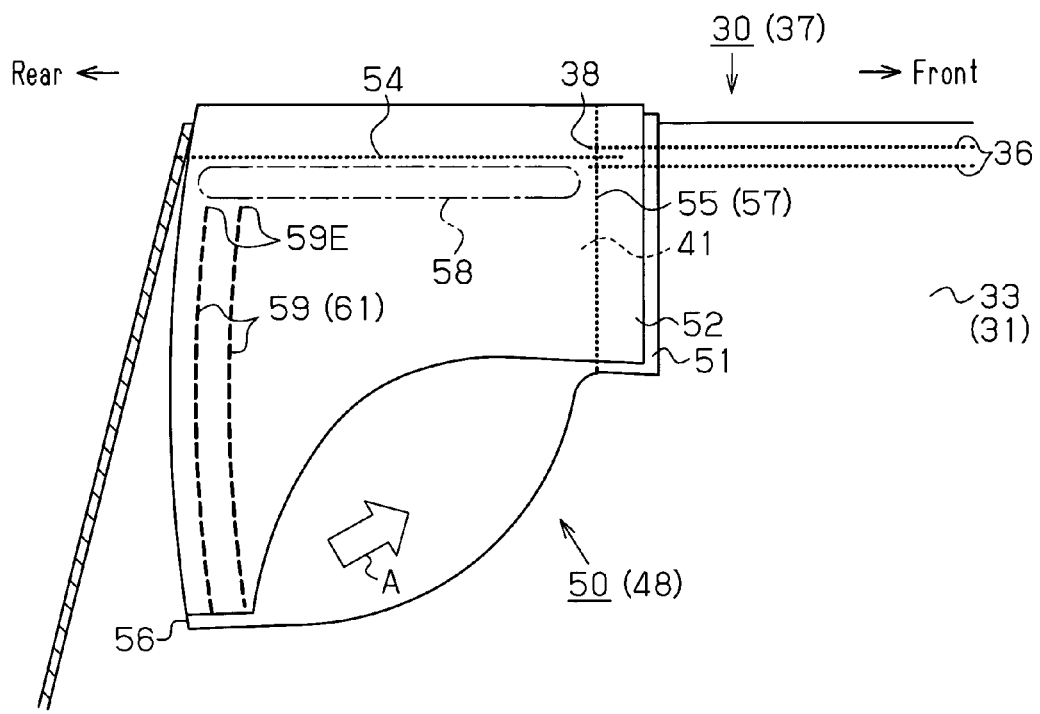
FIG. 12 is a diagram schematically illustrating the gas releasing valve at the early stage of inflation of the airbag.
Figure 13:
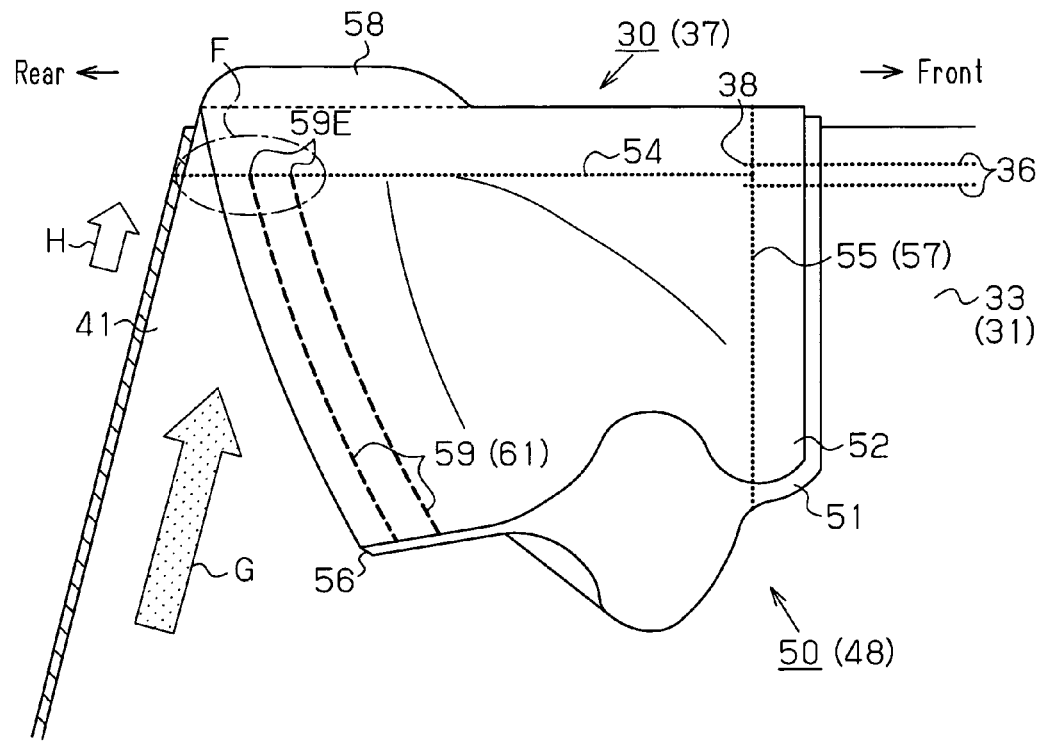
FIG. 13 is a diagram schematically illustrating a state of the gas releasing valve illustrated in FIG. 12 after the gas releasing valve has been further operated.
Figure 14:
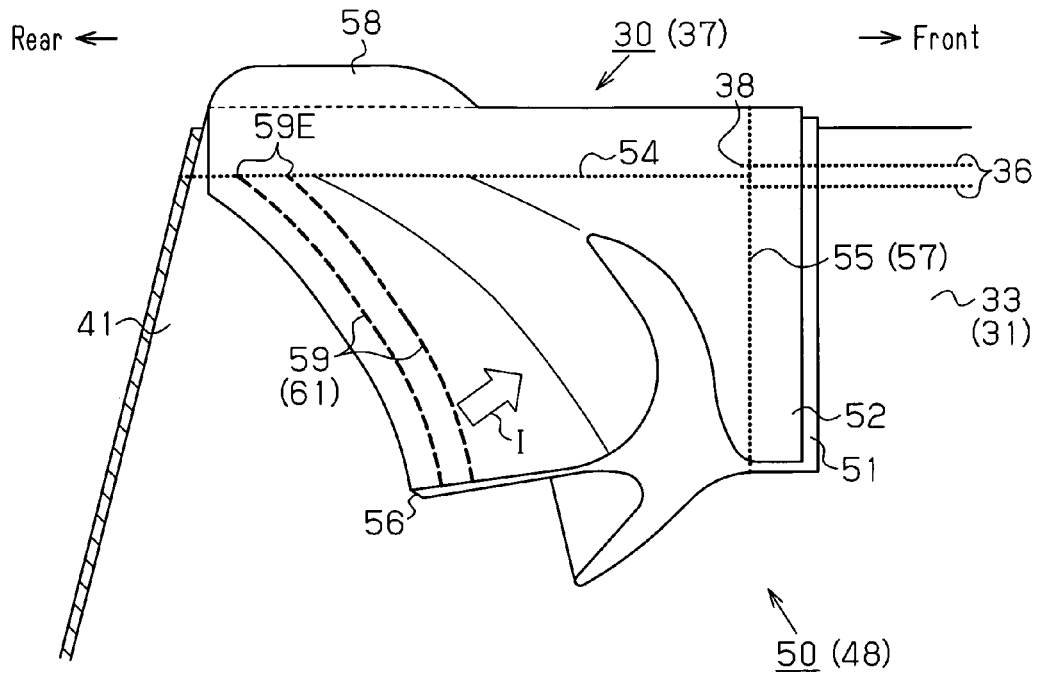
FIG. 14 is a diagram schematically illustrating a state of the vent hole closed through operation of the gas releasing valve illustrated in FIG. 13 due to a pressure rise in the airbag.
Figure 15:
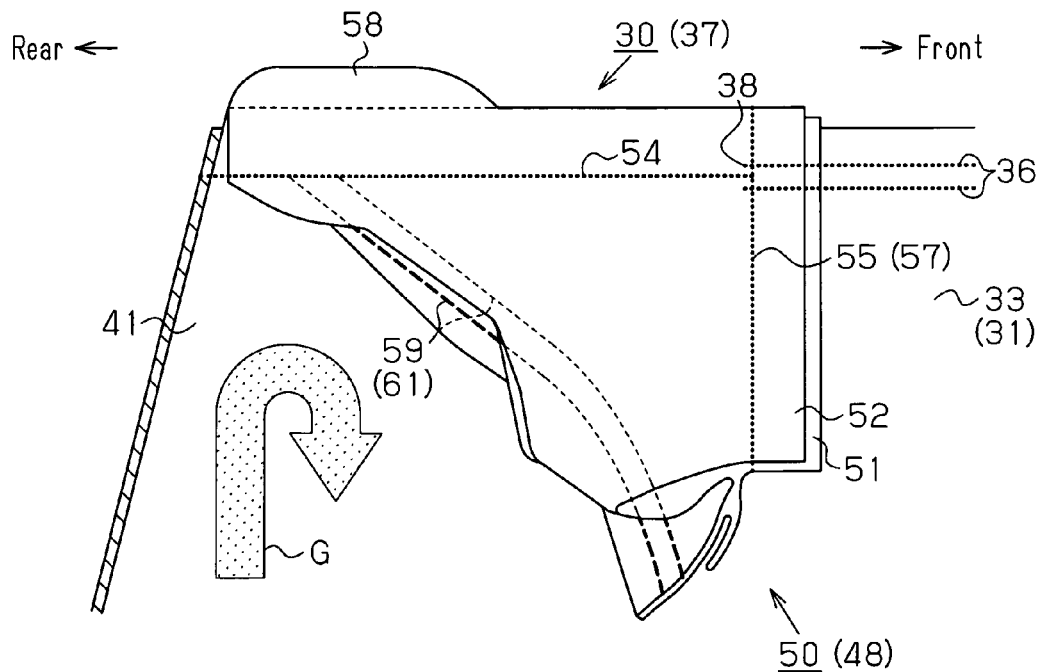
FIG. 15 is a diagram schematically illustrating the vent hole in a state fully closed by the gas releasing valve illustrated in FIG. 14, thus restricting discharge of inflation gas.
Figure 16:
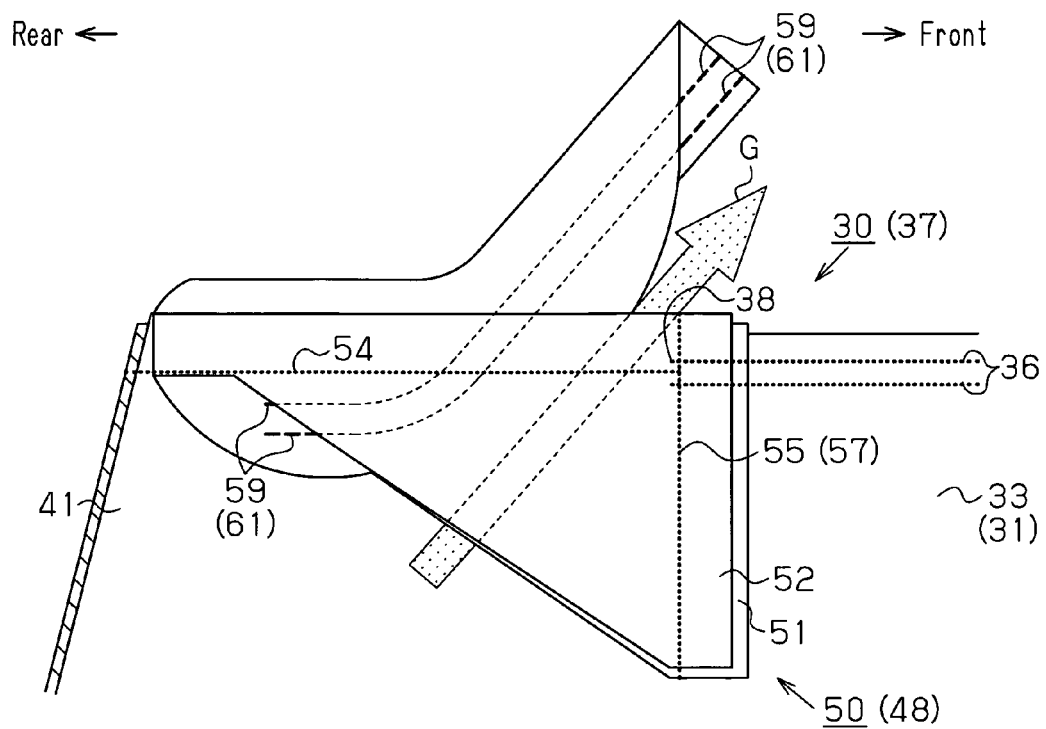
FIG. 16 is a diagram schematically illustrating a flex-resistant portion of the gas releasing valve illustrated in FIG. 14 reversed to open the vent hole.

When the inflating portion 37 is in a non-inflated state and the inflation gas G is supplied to the inflating portion 37, some of the inflation gas G flows in the gap between the first valve body portion 51 and the second valve body portion 52 of the gas releasing valve 50 and proceeds toward the outside of the inflating portion 37 (see FIG. 9). When the inflation gas G flows in the gap between the first valve body portion 51 and the second valve body portion 52, the force inflating the valve body portions 51, 52 in a cylindrical shape is produced in the valve body portions 51, 52, as illustrated in FIGS. 9 and 12.

Specifically, the end of the first valve body portion 51 on the released gas downstream side is joined to the first gas releasing wall 41 and the end of the second valve body portion 52 on the released gas downstream side is joined to the second gas releasing wall 42. Further, the parts (the front parts) of the valve body portions 51, 52 at one side of the extending direction of the downstream end joint portions 53, 54 are joined to the gas releasing walls 41, 42 integrally with the first edge joint portion 55 (the wall joint portion 57). Also, the parts (the rear parts) of the valve body portions 51, 52 on the other side of the extending direction of the downstream end joint portions 53, 54 are joined to each other with the flex-resistant portion 59 (the auxiliary joint portion 61) and the second edge joint portion 56. Accordingly, the valve body portions 51, 52 are inflated in the cylindrical shape.

However, when the valve body portions 51, 52 are to be inflated in the cylindrical shape, the diameter (the circumferential length) of each flexible portion 58 is different from the diameter of the portion located on the released gas upstream side of the flexible portion 58. As has been described, in the gas releasing valve 50, each flex-resistant portion 59 (the auxiliary joint portion 61) is arranged at the position spaced forward from the second edge joint portion 56 (the fold line 49) of the fabric sheet 48. Accordingly, in the flexible portion 58, the interval D1 between the second edge joint portion 56 (the fold line 49) and the wall joint portion 57 (the first edge joint portion 55) is set to a value greater than the interval D2 between the flex-resistant portion 59 (the auxiliary joint portion 61) and the wall joint portion 57 (the first edge joint portion 55) (see FIG. 11). As a result, the parts of the valve body portions 51, 52 located on the released gas upstream side of the flexible portion 58 are to be inflated each in a cylindrical shape having a diameter (a circumferential length) smaller than that of the flexible portion 58.

However, as has been described, the parts (the front parts) of the valve body portions 51, 52 at one side of the extending direction of the downstream end joint portions 53, 54 are joined to the gas releasing walls 41, 42. Contrastingly, the parts (the rear parts) of the valve body portions 51, 52 on the other side of the extending direction of the downstream end joint portions 53, 54 are joined only to each other with the flex-resistant portion 59 (the auxiliary joint portion 61) without being joined to the gas releasing walls 41, 42. In other words, the parts (the front parts) of the valve body portions 51, 52 at one side of the extending direction of the downstream end joint portions 53, 54 are immovable with respect to the gas releasing walls 41, 42. However, the parts (the rear parts) of the valve body portions 51, 52 on the other side of the extending direction of the downstream end joint portions 53, 54 are movable with respect to the gas releasing walls 41, 42. Further, in the valve body portions 51, 52, the flex-resistant portions 59 are hard and not flexible but the flexible portions 58 are soft and flexible.

Accordingly, as has been described, the flexible portion 58 of each valve body portion 51, 52 is inflated in a cylindrical shape having a relatively great diameter (circumferential length) and the part of the valve body portion 51, 52 is inflated in a cylindrical shape having a relatively small diameter (circumferential length). The flexible portions 58 are thus moved toward the released gas downstream side and bent. This moves the parts of the valve body portions 51, 52 located on the released gas upstream side of the flexible portions 58 as indicated by arrow A in FIG. 12. In other words, the parts of the valve body portions 51, 52 at the released gas upstream side are each moved about the portion in the vicinity of the downstream end 59E of the flex-resistant portion 59 (encompassed by frame F of the single-dotted chain line in FIG. 13), which is the support point, toward the downstream end joint portions 53, 54 (upward) and toward the wall joint portion 57 (the first edge joint portion 55) (forward). This inclines each flex-resistant portion 59 in such a manner that a part closer to the released gas upstream side is located more forward. Further, in the parts of the valve body portions 51, 52 located on the released gas upstream side of the flexible portions 58, the flex-resistant portions 59 are not flexible but the other portions are flexible. Accordingly, as the part of each valve body portion 51, 52 at the released gas upstream side is moved in the above-described directions, crumples are formed easily in the portion between the wall joint portion 57 (the first edge joint portion 55) and the flex-resistant portion 59 (the auxiliary joint portion 61), which are flexible.

As has been described, the inflation gas G flows in the gap between the first valve body portion 51 and the second valve body portion 52 and proceeds toward the outside of the airbag 30. This suppresses a pressure rise of the inflation gas G in the gap between the valve body portions 51, 52.

As the inflation gas G is generated, the airbag 30 starts to inflate. Since the airbag 30 is inflated despite the suppressed pressure rise of the inflation gas G in the gap between the valve body portions 51, 52, the interval between each valve body portion 51, 52 and the corresponding gas releasing wall 41, 42 is increased (see FIG. 9). The ends of the valve body portions 51, 52 at the released gas downstream side are joined to the corresponding gas releasing walls 41, 42 with the associated downstream end joint portions 53, 54, each of which extends in the direction crossing the gas releasing direction of the inflation gas G. This prevents the inflation gas G from flowing toward the released gas downstream side of the downstream end joint portions 53, 54. Accordingly, the inflation gas G is accumulated in the space between the first valve body portion 51 and the first gas releasing wall 41 and the space between the second valve body portion 52 and the second gas releasing wall 42.

When the pressure of the inflation gas G in the space between each valve body portion 51, 52 and the corresponding gas releasing wall 41, 42 exceeds the pressure of the inflation gas G in the space between the valve body portions 51, 52, the gas releasing valve 50 operates in the manner described below. Specifically, the flexible portions 58, which are moved toward the released gas downstream side and flexed due to the difference in the diameters (the circumferential lengths), receive the pressure of the inflation gas G and thus become pressed toward the released gas downstream side. This further presses the flexible portions 58 of the valve body portions 51, 52 further upward as indicated by arrow H in FIG. 13. Correspondingly, the part of each valve body portion 51, 52 on the released gas upstream side of the flexible portion 58 is moved further toward the downstream end joint portion 53, 54 (further upward) and further toward the wall joint portion 57 (further forward).

In this state, each flex-resistant portion 59 is also moved upward and approaches the downstream end joint portion 53, 54. Then, while maintaining its shape, the flex-resistant portion 59 is bent about the end (the downstream end 59E) of the flex-resistant portion 59 that is located close to the downstream end joint portion 53, 54, which is the support point, toward the downstream end joint portion 53, 54 (upward) and toward the wall joint portion 57 (forward). In this state, like the flexible portions 58, the parts of the valve body portions 51, 52 located on the released gas upstream side of the flexible portions 58, except for the flex-resistant portions 59, also receive the pressure of the inflation gas G in the inflating portion 37, which is directed toward the released gas downstream side. After having received the pressure, as indicated by arrow I in FIG. 14, the portions are bent diagonally upward and forward in such a manner that the portions are pressed into the space between the valve body portions 51, 52. This decreases the space between the valve body portions 51, 52, which is the flow passage area of the inflation gas G.

In the present embodiment, the length L3 of each flex-resistant portion 59 is greater than the interval D3 (L3>D3), as has been described. Accordingly, when the flex-resistant portion 59 is bent diagonally upward in the above-described manner, the flex-resistant portion 59 contacts the wall joint portion 57 (the first edge joint portion 55), with reference to FIG. 15. The wall joint portion 57 (the first edge joint portion 55) restricts bending of each flex-resistant portion 59 further toward the downstream end joint portion 53, 54 (further upward) and further toward the wall joint portion 57 (further forward). In this state, the gas releasing valve 50 substantially closes the vent hole 38. This prevents the inflation gas G in the airbag 30 (the inflating portion 37) from flowing toward the outside of the airbag 30 (the inflating portion 37) via the gap between the valve body portions 51, 52.

Particularly, in the present embodiment, the inflation gas G in the airbag 30 (the inflating portion 37) flows to the outside of the airbag 30 only via the gas releasing valve 50. The inflation gas G in the airbag 30 (the inflating portion 37) is prevented from escaping to the outside of the airbag 30 (the inflating portion 37) without passing through the gas releasing valve 50. This prevents the rising speed of the pressure in the airbag 30 (the inflating portion 37) from dropping due to the aforementioned escape of the inflation gas G.

As the inflating portion 37 is inflated in the above-described manner, the airbag 30 is unfolded and developed in the order opposite to the order by which the airbag 30 has been folded.

The airbag 30 then comes out of the seat back 14 with the rear part remaining in the storage portion 15 of the seat back 14. As the inflation gas G is supplied continuously to the airbag 30, the airbag 30 is unfolded and developed between the body side portion 11 and the thorax PT of the occupant P seated on the vehicle seat 12 and toward the front side of the vehicle 10 as illustrated in FIGS. 2 and 3. The airbag 30 is thus arranged between the occupant P and the body side portion 11, which projects toward the interior of the vehicle 10. The airbag 30 thus presses the thorax PT of the occupant P inward in the widthwise direction of the vehicle and restrains the thorax PT of the occupant P. In this manner, the airbag 30 absorbs the impact applied to the thorax PT of the occupant P through the body side portion 11 from the side, thus protecting the thorax PT of the occupant P.

The vent hole 38 is maintained closed by the gas releasing valve 50 continuously until the pressure of the inflation gas G in the airbag 30 (the inflating portion 37) exceeds a predetermined value α. The value α is the upper limit of the range of pressure required for protecting and restraining the thorax PT of the occupant P.

As the inflation gas G is continuously supplied to the interior of the inflating portion 37 with the vent hole 38 held in a closed state or the occupant P is restrained by the airbag 30 in the inflated state, the pressure in the inflating portion 37 increases. When the pressure in the inflating portion 37 reaches the value α, each flex-resistant portion 59, which has been held in contact with the wall joint portion 57 (the first edge joint portion 55) and thus stopped, moves beyond the wall joint portion 57 (the first edge joint portion 55). The flex-resistant portion 59 is then pushed out to the outside of the inflating portion 37 through the gap between the valve body portions 51, 52. Correspondingly, the parts of the valve body portions 51, 52 on the released gas upstream side of the flexible portions 58, following movement of the flex-resistant portions 59, move beyond the wall joint portion 57 and turn over (become reversed). That is, a part of the gas releasing valve 50 is pushed out to the outside of the inflating portion 37 through the vent hole 38. Through such pressing (reversal), the vent hole 38, which has been closed by the valve body portions 51, 52, becomes open, allowing the inflation gas G to flow from the inflating portion 37 to the outside of the inflating portion 37 via the vent hole 38. This decreases the pressure in the inflating portion 37.

In this state, variation of the timings at which the vent hole 38 is opened by the gas releasing valve 50 is suppressed compared to the conventional technique in which the vent hole is opened by rupturing the joint portion. Specifically, unlike the apparatus of the conventional technique that physically ruptures the joint portion, the gas releasing valve 50 does not include a part that is physically ruptured in order to open the vent hole 38, which is a part exhibiting a varied rupture strength when ruptured. That is, the gas releasing valve 50 operates according to the pressure in the inflating portion 37, without being influenced by the varied rupture strength. This suppresses variation of the timings at which the vent hole 38 is opened by the gas releasing valve 50.

Although the main operating mode of the gas releasing valve 50 has been described above, other operating modes different from the above-described mode may be employed. In one such mode, the gas releasing valve 50 operates in the same manner as the above-described main mode until the gas releasing valve 50 reaches the state illustrated in FIG. 12. Specifically, the flexible portion 58 of each valve body portion 51, 52 and the part of the valve body portion 51, 52 on the released gas upstream side of the flexible portion 58 are inflated in cylindrical shapes having different diameters (circumferential lengths). The flexible portions 58 are thus moved toward the released gas downstream side. Then, the associated flex-resistant portion 59 (the associated auxiliary joint portion 61) is moved toward the downstream end joint portion 53, 54 (upward) and toward the wall joint portion 57 (the first edge joint portion 55) (forward).

Afterwards, the parts of the valve body portions 51, 52 on the released gas upstream side of the flexible portions 58 are brought closer to each other by the pressure of the inflation gas G. These parts of the valve body portions 51, 52 are thus overlapped with each other (held in tight contact with each other). In this overlapped (tightly contacting) state, the overlapped parts of the valve body portions 51, 52 become crushed toward the released gas downstream side, thus closing the vent hole 38. When the pressure in the airbag 30 (the inflating portion 37) reaches the predetermined value a, the gas releasing valve 50 operates in the same manner as the above-described main mode.

The present embodiment, which has been described in detail, has the advantages described below.

(1) In the gas releasing valve 50, the ends of the two valve body portions 51, 52 on the released gas downstream side are joined to the corresponding gas releasing walls 41, 42 with the downstream end joint portions 53, 54. In each of the valve body portions 51, 52, the flexible portion 58 is arranged in the part of the valve body portion 51, 52 on the released gas upstream side and in the vicinity of the downstream end joint portion 53, 54. The part (the front part) of each valve body portion 51, 52 at one side of the extending direction of the downstream end joint portion 53, 54 is joined to at least the corresponding gas releasing wall 41, 42 with the first edge joint portion 55. The first edge joint portion 55 functions as the wall joint portion 57, which joins at least the two gas releasing walls 41, 42 together. The parts (the rear parts) of the valve body portions 51, 52 on the other side of the extending direction of the downstream end joint portions 53, 54 are joined to each other with the second edge joint portion 56, which extends toward the released gas upstream side. Each auxiliary joint portion 61 is arranged between the first edge joint portion 55 and the second edge joint portion 56 and in the vicinity of the second edge joint portion 56. The auxiliary joint portion 61 joins the valve body portions 51, 52 to each other, and extends from the position on the released gas upstream side and in the vicinity of the flexible portion 58 further toward the released gas upstream side; The auxiliary joint portion 61 functions also as the flex-resistant portion 59, which extends toward the released gas upstream side and is less flexible than the flexible portion 58.

Accordingly, the gas releasing valve 50 is reliably operated in such a manner that, when the pressure in the airbag 30 (the inflating portion 37) is less than the value a, the vent hole 38 is closed and that, once the pressure in the airbag 30 (the inflating portion 37) reaches the value a, the vent hole 38 becomes open. Further, unlike the apparatus of the conventional technique in which the vent hole is opened by rupturing the joint portion, variation of the timings at which the vent hole 38 becomes open is suppressed. Accordingly, the gas releasing valve 50, which operates stably, is provided with a simple configuration. Also, it is unnecessary to provide independent means for driving the gas releasing valve 50 so as to selectively open and close the gas releasing valve 50 using the pressure of the inflation gas G.

(2) The length L3 of the flex-resistant portion 59 is greater than the interval D3 between the position B of the wall joint portion 57 and the end C of each downstream end joint portion 53, 54 in the vicinity of the flex-resistant portion 59. Accordingly, unless the pressure in the airbag 30 (the inflating portion 37) reaches the value $\alpha$, the flexible portions 58 and the portions on the released gas downstream side of the downstream end joint portions 53, 54 are prevented from moving beyond the wall joint portion 57 and becoming reversed. The passage between the valve body portions 51, 52 is thus reliably maintained in a closed state.

(3) If each flex-resistant portion 59 is formed of hard material, it is not easy to change the flexibility of the flex-resistant portion 59. However, in the present embodiment, the flex-resistant portion 59 is formed simply by sewing the valve body portions 51, 52, which are formed of the originally flexible material (the fabric sheet 48), using sewing threads. This facilitates formation of each flex-resistant portion 59, which is configured simply and less flexible than the flexible portion 58. It is also easy to change the type of the sewing threads or the number of the employed sewing threads. This facilitates adjustment of the flexibility of the flex-resistant portion 59 in order to set or change the timing at which the flex-resistant portion 59 is deformed and reversed.

(4) The first edge joint portion 55 and the wall joint portion 57 are formed by sewing the first and second valve body portions 51, 52 and the gas releasing walls 41, 42 together (integrally) using sewing threads. Accordingly, compared to a case in which the first edge joint portion 55 and the wall joint portion 57 are formed separately, the first edge joint portion 55 and the wall joint portion 57 are formed easily and quickly.

(5) The airbag 30 is used as a side airbag apparatus that is inflated by the inflation gas G, which is supplied in response to an impact from the side of the vehicle 10, and developed between the body side portion 11 and the thorax PT of the occupant P seated on the vehicle seat 12 and toward the front side of the vehicle 10. Accordingly, by preventing the pressure in the airbag 30 (the inflating portion 37) from increasing excessively with respect to the predetermined value $\alpha$ through operation of the gas releasing valve 50, the airbag 30 (the inflating portion 37) is allowed to gently protect the thorax PT of the occupant P, which has particularly low resistance to shock in the side of the body of the occupant P, from the impact.

(6) Compared to a side airbag apparatus in which the airbag 30 has only the vent hole 38 but not the gas releasing valve 50, the side airbag apparatus of the present embodiment has the following advantage.

Figure 17:
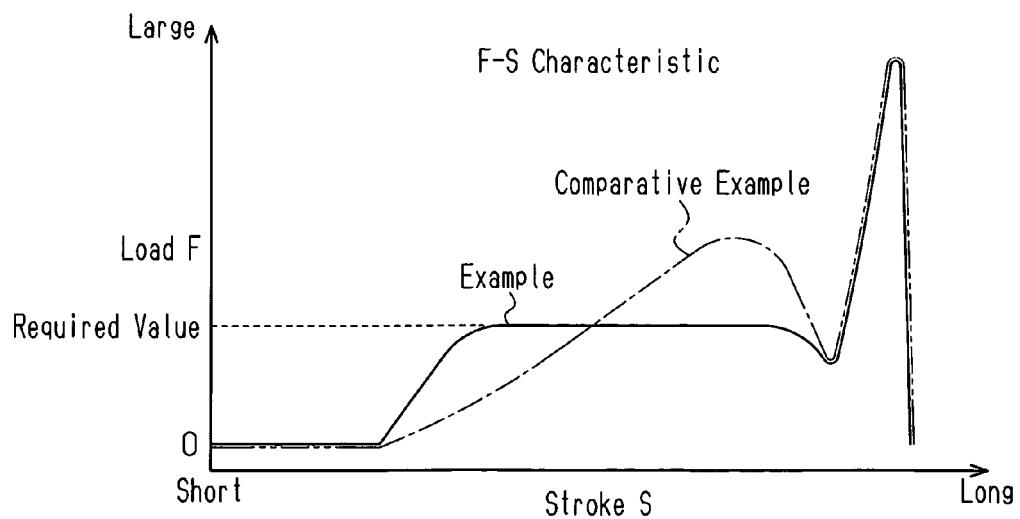
FIG. 17 is a graph representing the S (stroke)-F (Load) characteristics of the side airbag apparatus.

FIG. 17 represents the relationship between the movement amount (the stroke S) of the airbag 30 at the time when the inflation gas G is supplied to the airbag 30 and the airbag 30 is inflated and moved toward the occupant P and the load F applied to the occupant P. There is a positive correlation between the load F and the pressure in the airbag (the inflating portion 37).

In a side airbag apparatus having only the vent hole 38 but not the gas releasing valve 50 (see the comparative example of FIG. 17), the inflation gas G starts to escape to the outside of the airbag 30 through the vent hole 38 at an early stage of inflation of the airbag 30. This prolongs the time needed for increasing the load F to the value (the required value) necessary for protecting the occupant P, causing a delay of the timing at which the load F reaches the require valued and the occupant P is restrained and protected.

In contrast, in the airbag apparatus having both of the vent hole 38 and the gas releasing valve 50 (see the example of the present invention of FIG. 17), the inflation gas G escapes through the vent hole 38 only for an instant after the airbag 30 (the inflating portion 37) starts to inflate. However, the vent hole 38 is closed by the gas releasing valve 50 immediately after this instant. This shortens the time needed for the load F to reach the required value, thus advancing the timing at which the load F reaches the required value and the occupant P is restrained and protected. When the pressure in the airbag 30 (the inflating portion 37) becomes greater than or equal to the predetermined value, the gas releasing valve 50 becomes open and discharges the inflation gas G. This maintains the load F at the required value.

If it is assumed that the airbags 30 of both apparatuses carry out equal amounts of work, the case without the gas releasing valve 50 (see the comparative example) has the characteristic that, after having increased gradually, the load F exceeds the required value at a later stage of inflation of the airbag 30, thus reaching the maximum value. Contrastingly, the case with the gas releasing valve 50 (see the example of the invention) has the characteristic that the load F reaches the required value at an early stage of the inflation of the airbag 30 and is maintained substantially constant afterward, which is preferable to restrain and protect the occupant P. Specifically, in this case, the load F has a relatively small maximum value so that the thorax PT of the occupant P is prevented from receiving an excessively great load.

The present invention may be embodied in the other forms described below.

<Modification to Inflator Assembly 20>

The inflator 21 may be attached directly to the seat back 14 without employing the retainer 22.

The retainer 22 may be changed to an inner tube formed by a fabric sheet and shaped like a tube. Such modification may be carried out only when it is assumed that the inner tube is prevented from being greatly damaged by the heat and the pressure of the inflation gas G sent from the inflator 21.

Specifically, the modification is permitted when, for example, the inflator 21 is a type that blasts the inflation gas G at a comparatively low temperature, such as a hybrid type inflator retaining the inflation gas G. Specifically, compared to the pyrotechnic inflator that generates the inflation gas G using the gas generating agent through a heat generating chemical reaction, the inflation gas G blasted by the hybrid type inflator is low in temperature.

The above-described modification may be carried out even for the pyrotechnic inflator if the inner tube is formed by a coated fabric sheet having a coating layer for improving the heat resistance.

In the airbag apparatus, the inflator assembly 20 may be arranged outside the airbag 30. In this case, the inflator 21 and the airbag 30 may be connected to each other with a pipe. The inflation gas G, which is blasted from the inflator 21, is thus supplied to the airbag 30 through the pipe.

<Modification to Airbag 30>

The present invention may be used in an airbag apparatus having an airbag 30 with a plurality of inflating portions 37. In this case, the inflating portions 37 may be independent from one another or each adjacent pair of the inflating portions 37 may communicate with each other. At lease one of the inflating portions 37 has a vent hole 38 and a gas releasing valve 50.

<Modification to Gas Releasing Valve 50>

The hardness (the rigidity) or the length L3 of each flex-resistant portion 59 may be changed. This adjusts the pressure in the inflating portion 37 at the time when the flex-resistant portion 59 moves beyond the wall joint portion 57 and reverses the valve body portions 51, 52.

As means for changing the hardness (the rigidity) of each flex-resistant portion 59 that is formed by sewing, the stitch length (the pitch), the type, or the size of the sewing threads may be changed. Alternatively, the number of the employed sewing threads may be increased or decreased.

For example, as the size of the sewing threads or the number of the sewing threads becomes greater, the hardness (the rigidity) of the flex-resistant portion 59 becomes greater and the pressure in the inflating portion 37 at the time when the flex-resistant portion 59 reverses the valve body portions 51, 52 becomes higher.

If the flex-resistant portion 59 is formed by adhesion, the type or the amount of application (the thickness) of the adhesive may be changed as the means for changing the hardness (the rigidity) of each flex-resistant portion 59. For example, as the amount of application becomes greater, the hardness (the rigidity) of the flex-resistant portion 59 becomes greater and the pressure in the inflating portion 37 at the time when the flex-resistant portion 59 reverses the valve body portions 51, 52 becomes higher.

The vent hole 38 and the gas releasing valve 50 may be arranged at positions in the airbag 30 that are different from the corresponding positions of the above-described embodiment.

Figure 18:
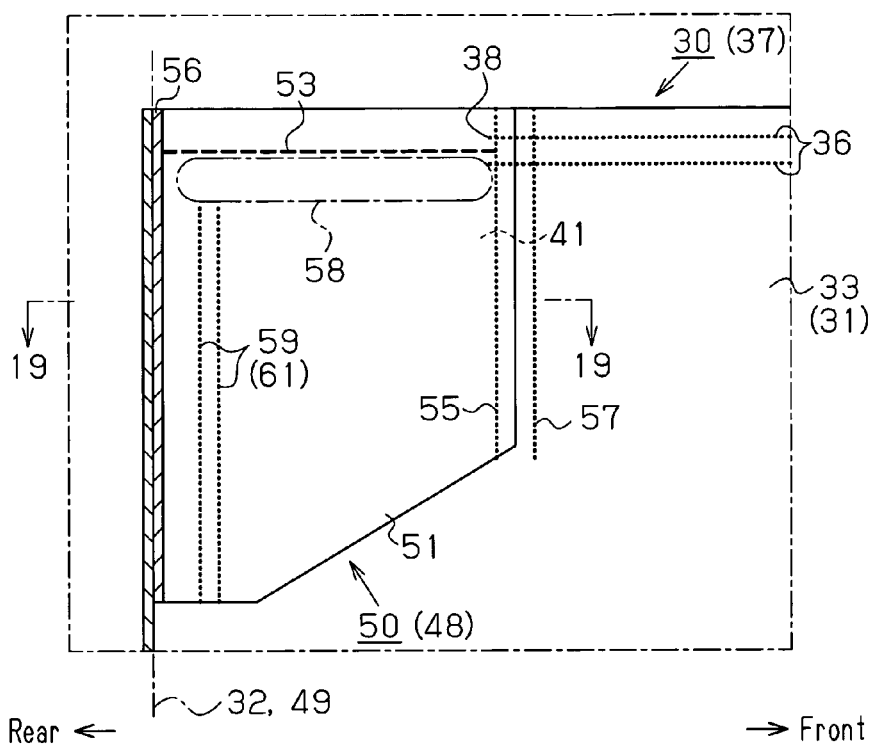
FIG. 18 is a cross-sectional view corresponding to FIG. 8, showing a part of a modification of a gas releasing valve having a wall joint portion that is formed at a position different from the position of the first edge joint portion.
Figure 19:
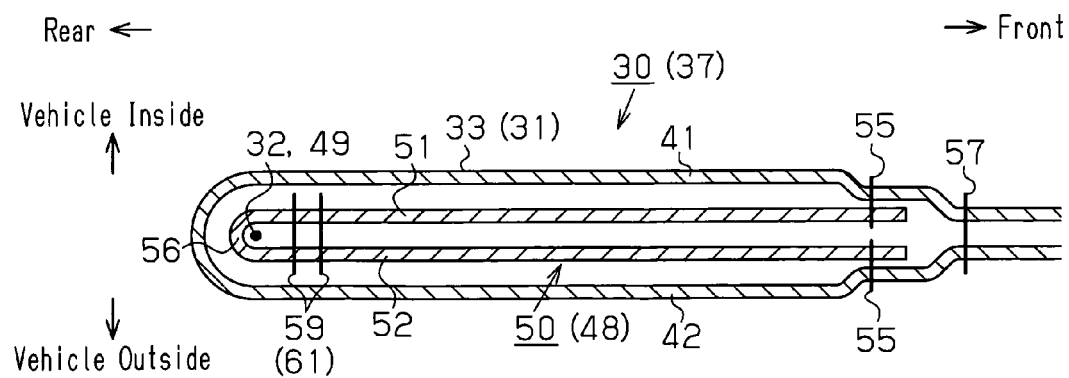
FIG. 19 is a cross-sectional view showing a part of the gas releasing valve taken along line 19-19 of FIG. 18.

As illustrated in FIGS. 18 and 19, the first edge joint portions 55 and the wall joint portion 57 may be arranged at different positions in the airbag 30. That is, the first edge joint portions 55 may be located at any suitable positions as long as the part (the front part) of each of the first and second valve body portions 51, 52 at one side of the extending direction of the downstream end joint portion 53, 54 is joined to at least the corresponding gas releasing wall 41, 42. FIG. 19 represents an example in which the first edge joint portion 55 located on the vehicle inner side joins the first valve body portion 51 only to the first gas releasing wall 41 and the first edge joint portion 55 located on the vehicle outer side joins the second valve body portion 52 only to the second gas releasing wall 42.

The wall joint portion 57 may be arranged at any suitable position as long as the wall joint portion 57 is in the vicinity of the first edge joint portion 55 and joins at least the two gas releasing walls 41, 42 to each other.

Even in this case, in which the first edge joint portions 55 and the wall joint portion 57 are arranged at the different positions, the same advantages as the advantages of the above-described embodiment are ensured.

Although the wall joint portion 57 is formed independently from the peripheral joint portion 36 in FIG. 18, the wall joint portion 57 may be formed as a part of the peripheral joint portion 36. For example, a part (a left portion as viewed in FIG. 18) of the peripheral joint portion 36 may be curved in a V shape or a U shape. In this case, a left half of the V-shaped or U-shaped portion functions also as the wall joint portion 57.

Figure 20:
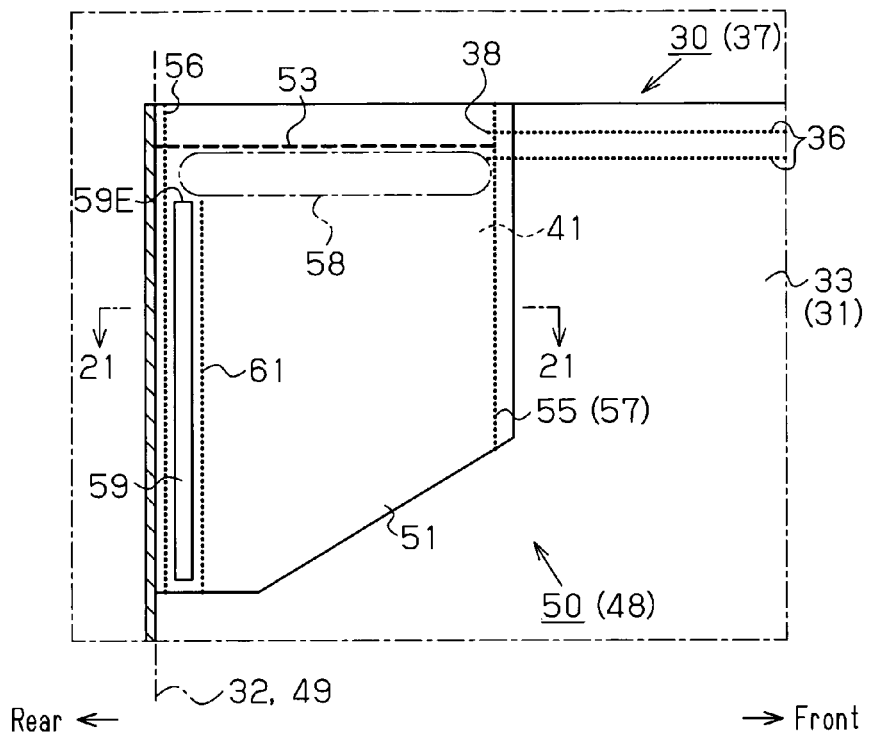
FIG. 20 is a diagram corresponding to FIG. 8 and showing a part of another modification of a gas releasing valve having a flex-resistant portion that is formed at a position different from the position of the auxiliary joint portion.
Figure 21:
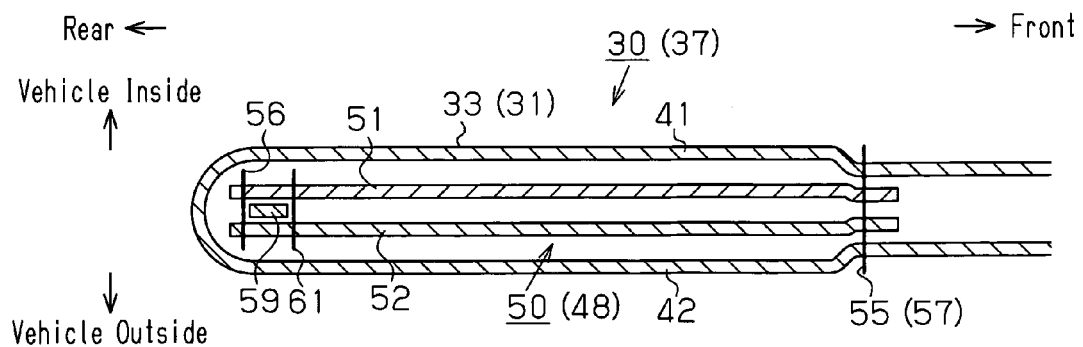
FIG. 21 is a cross-sectional view showing a part of the gas releasing valve taken along line 21-21 of FIG. 20.

As illustrated in FIGS. 20 and 21, the flex-resistant portion 59 and the auxiliary joint portion 61 may be arranged at different positions in each of the valve body portions 51, 52. That is, the auxiliary joint portion 61 may be arranged at any suitable position as long as it is located between the first edge joint portion 55 and the second edge joint portion 56 and in the vicinity of the second edge joint portion 56, joins the valve body portions 51, 52 to each other, and extends from the position on the released gas upstream side and in the vicinity of the flexible portion 58 further toward the released gas upstream side. The flex-resistant portion 59 may be arranged at any suitable position as long as it is located on or in the vicinity of the auxiliary joint portion 61 of the gas releasing valve 50, extends toward the released gas upstream side, and is less flexible than the flexible portion 58. Even in this case, in which each flex-resistant portion 59 is arranged at the different position, the same advantages as the advantages of the above-described embodiment are ensured.

As illustrated in FIGS. 20 and 21, the gas releasing valve 50 may be formed by overlapping a pair of independent fabric sheets. Specifically, the fabric sheet located on the vehicle inner side corresponds to the first valve body portion 51 and the fabric sheet located on the vehicle outer side corresponds to the second valve body portion 52. The two valve body portions 51, 52 are joined together in a tubular shape. In this case, the parts (the rear parts) of the valve body portions 51, 52 on the other side of the extending direction of the downstream end joint portions 53, 54 are joined to each other with the second edge joint portion 56. In this regard, the modification illustrated in FIGS. 20 and 21 is different from the above-described embodiment in which the single fabric sheet is folded in half and the folded portion (in the proximity of the fold line 49) is defined as the second edge joint portion 56.

Although each flex-resistant portion 59 (each auxiliary joint portion 61) of the gas releasing valve 50 is arranged parallel with the fold line 32 of the airbag 30 in the above-described embodiment, the flex-resistant portion 59 may extend in a direction crossing the fold line 32.

The first edge joint portion 55 (the wall joint portion 57) may be nonparallel to the flex-resistant portion 59 (the auxiliary joint portion 61). In this case, the first edge joint portion 55 (the wall joint portion 57) may be linear or bent or curved.

On condition that each flex-resistant portion 59 is on or in the vicinity of the auxiliary joint portion 61 of the gas releasing valve 50, extends toward the released gas upstream side, and is less flexible than the flexible portion 58, the flex-resistant portion 59 may be formed using any suitable material other than sewing threads. For example, as illustrated in FIGS. 20 and 21, a rod-like member formed of synthetic resin or metal may be employed as the flex-resistant portion 59.

The end of each valve body portion 51, 52 on the released gas upstream side may be either inclined as illustrated in FIG. 8 or non-inclined.

As long as the downstream end joint portions 53, 54 extend in the directions crossing the releasing direction of the inflation gas G from the vent hole 38, the downstream end joint portions 53, 54 do not necessarily have to extend in directions substantially perpendicular to the gas releasing direction, unlike the above-described embodiment.

<Modification to Storage Position of Airbag Module AM>

When the airbag apparatus is embodied as a side airbag apparatus as in the above-described embodiment, the storage portion 15 may be arranged in a part of the body side portion 11 that is in the vicinity of the occupant P seated on the vehicle seat 12 and located on the vehicle outer side, instead of in the seat back 14.

<Other Modifications>

When the airbag apparatus is embodied as a side airbag apparatus as in the above-described embodiment, the body part of the occupant P restrained and protected by the airbag 30 may be parts different from the thorax PT, such as the lumbar region, the abdomen, the shoulder, or any combination thereof.

The present invention may be used in airbag apparatus of types different from the side airbag apparatus, such as a head protecting airbag apparatus, a rear impact airbag apparatus, a forward slide preventing airbag apparatus, a pedestrian protecting airbag apparatus, or a knee protecting airbag apparatus.

Therefore, the present examples and embodiments are to be considered as illustrative and not restrictive and the invention is not to be limited to the details given herein, but may be modified within the scope and equivalence of the appended claims.

The invention claimed is:

1. An airbag apparatus having an airbag having an inflating portion, the inflating portion of the airbag having a pair of gas releasing walls, a vent hole being formed between the gas releasing walls to discharge inflation gas from the inflating portion, the airbag including a gas releasing valve having a first valve body portion and a second valve body portion that are arranged in the vicinity of the vent hole and overlapped with each other, the gas releasing valve operating according to a pressure in the airbag to selectively open and close the vent hole, wherein the first valve body portion and the second valve body portion each have an end at a released gas downstream side on which the inflation gas is discharged, the end of each of the first valve body portion and the second valve body portion on the released gas downstream side being joined to corresponding one of the gas releasing walls with a downstream end joint portion extending in a direction crossing a releasing direction of the inflation gas, wherein the first and second valve body portions each have a flexible portion arranged in a part in the vicinity of and on a released gas upstream side of the corresponding downstream end joint portion, the flexible portions being flexible toward the released gas downstream side of the inflation gas, wherein each of the first and second valve body portions has a first side portion and a second side portion on both sides of an extending direction of the downstream end joint portion, the first side portion of each valve body portion being joined to at least the corresponding gas releasing wall with a first edge joint portion, wherein a wall joint portion, which joins at least both gas releasing walls to each other, is arranged on the first edge joint portion or in the vicinity of the first edge joint portion, wherein the second side portions of the first valve body portion and the second valve body portion are joined to each other with a second edge joint portion extending in the gas releasing direction, wherein an auxiliary joint portion is arranged between the first edge joint portion and the second edge joint portion and in the vicinity of the second edge joint portion, the auxiliary joint portion joining the first valve body portion and the second valve body portion to each other and extending, from a position in the vicinity of and on the released gas upstream side of the flexible portion, further toward the released gas upstream side, and wherein a flex-resistant portion that extends in the gas releasing direction and is less flexible than the flexible portion is arranged on the auxiliary joint portion of the gas releasing valve or in the vicinity of the auxiliary joint portion.

2. The airbag apparatus according to claim 1, wherein the downstream end joint portion has an end on the side corresponding to the second side portion, the length of the flex-resistant portion being set to a value greater than the distance from the position at which the interval between the wall joint portion and the flex-resistant portion is minimum to the end of the downstream end joint portion.

3. The airbag apparatus according to claim 1, wherein the flex-resistant portion is formed by sewing the first valve body portion and the second valve body portion together using a sewing thread.

4. The airbag apparatus according to claim 1, wherein the first edge joint portion and the wall joint portion are formed by sewing the first valve body portion, the second valve body portion, and both gas releasing walls together using a sewing thread.

5. The airbag apparatus according to claim 1, wherein the airbag apparatus is a side airbag apparatus mounted in a vehicle having a body side portion and a vehicle seat, the airbag being inflated by the inflation gas supplied in response to an impact applied to the vehicle from the side and developed between the body side portion of the vehicle and an occupant seated on the vehicle seat and toward the front side of the vehicle.

6. The airbag apparatus according to claim 1, wherein the vent hole is closed by the first valve body portion and the second valve body portion through movement of the flex-resistant portion toward the first side portion caused by supply of the inflation gas, and wherein, when the pressure in the airbag becomes greater than or equal to a predetermined value, a part of the gas releasing valve is pushed out of the inflating portion through the vent hole, thus opening the vent hole.

7. The airbag apparatus according to claim 1, wherein the gas releasing valve is formed by folding a single sheet in half in a manner inflatable in a tubular shape through supply of the inflation gas.

* * * * *